US012754919B2

(12) United States Patent
Xie et al.

(10) Patent No.: US 12,754,919 B2
(45) Date of Patent: Oct. 6, 2026

(54) TRANSACTION PROCESSING METHOD, DISTRIBUTED DATABASE SYSTEM, CLUSTER, AND MEDIUM

(71) Applicant: Huawei Cloud Computing Technologies Co., Ltd., Guizhou (CN)

(72) Inventors: Xiaoqin Xie, Beijing (CN); Zongquan Zhang, Gui'an (CN); Wenlong Ma, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 18/477,848

(22) Filed: Sep. 29, 2023

(65) Prior Publication Data

US 2024/0028598 A1 Jan. 25, 2024

Related U.S. Application Data

(63) Continuation of application No. PCT/CN2021/112643, filed on Aug. 14, 2021.

(30) Foreign Application Priority Data

Apr. 6, 2021 (CN) ........................ 202110369369.X
Jun. 18, 2021 (CN) ........................ 202110679707.X

(51) Int. Cl.
*G06F 16/2455* (2019.01)
*G06F 16/23* (2019.01)

(52) U.S. Cl.
CPC .... *G06F 16/24568* (2019.01); *G06F 16/2308* (2019.01)

(58) Field of Classification Search
CPC ....................... G06F 16/24568; G06F 16/2308
See application file for complete search history.

(56) References Cited

U.S. PATENT DOCUMENTS 11,526,304 B2* 12/2022 Davis ...................... G06F 3/067
2004/0068501 A1* 4/2004 McGoveran ........ G06F 11/1474 714/E11.131
2004/0148289 A1 7/2004 Bamford et al.
2005/0154756 A1* 7/2005 Dettinger ............ G06F 16/3322 707/E17.139
2008/0005504 A1* 1/2008 Barnes ................ G06F 12/0815 711/156
2010/0005124 A1* 1/2010 Wagner ................... G06F 16/27 707/E17.007
2010/0082656 A1* 4/2010 Jing .................. G06F 16/24552 707/E17.014

(Continued)

FOREIGN PATENT DOCUMENTS

CN 106647412 A 5/2017

*Primary Examiner* — Sherief Badawi
*Assistant Examiner* — Earl Levi Elias
(74) *Attorney, Agent, or Firm* — Conley Rose, P.C.

(57) ABSTRACT

A transaction processing method includes the coordinating node receiving a plurality of query statements sent by a client, creating a transaction based on a first query statement in the plurality of query statements, executing the transaction in the global memory based on a second query statement in the plurality of query statements, and submitting the transaction based on a third query statement in the plurality of query statements.

20 Claims, 9 Drawing Sheets

(56) References Cited

U.S. PATENT DOCUMENTS

2014/0280024 A1* 9/2014 Baskett ............. G06F 16/24528
707/714
2015/0134703 A1* 5/2015 Singh .................... G06F 16/178
707/803
2015/0280959 A1* 10/2015 Vincent ................... H04L 67/52
709/203
2016/0246842 A1* 8/2016 Li ..................... G06F 16/24542
2016/0342658 A1* 11/2016 Skrzypczak ...... G06F 16/24568
2018/0349418 A1 12/2018 Lee et al.
2019/0034487 A1* 1/2019 Balachandran ....... G06F 16/335
2019/0392061 A1* 12/2019 Terry .................. G06F 16/2365

* cited by examiner

TRANSACTION PROCESSING METHOD, DISTRIBUTED DATABASE SYSTEM, CLUSTER, AND MEDIUM

CROSS-REFERENCE TO RELATED APPLICATIONS

This is a continuation of International Patent Application No. PCT/CN2021/112643 filed on Aug. 14, 2021, which claims priority to Chinese Patent Application No. 202110679707.X filed on Jun. 18, 2021 and Chinese Patent Application No. 202110369369.X filed on Apr. 6, 2021. All of the aforementioned patent applications are hereby incorporated by reference in their entireties.

TECHNICAL FIELD

This disclosure relates to the field of database technologies, and in particular, to a transaction processing method, a distributed database system, a transaction processing system, a cluster, a computer-readable storage medium, and a computer program product.

BACKGROUND

With continuous development of database technologies, management of data (for example, employee attendance data, employee salary data, and production data) through a database gradually becomes a mainstream trend. The database is a data set stored together in a manner, shared with a plurality of users, featuring a minimum possible redundancy, and independent of an application. A user can access the database through a client application (referred to as a client for short below) to implement data reading or writing.

Data reading or writing is generally implemented by a database system. The database system includes a database management system (DBMS). The database system creates, queries, updates, and deletes data through the foregoing DBMS. The user triggers an operation on data in the database through the client, and the database system executes a corresponding transaction in response to the operation. Using the data writing as an example, the database system performs a data writing operation, writes data into a node of the database system, and then writes the data into the database, for example, a shared storage database, to implement data persistence.

Considering high reliability and high availability of a distributed database system, more users (for example, enterprise users) use the distributed database system for data management. The distributed database system can be deployed in a real application cluster (RAC). The cluster is a distributed database storage engine cluster based on a shared-everything data architecture designed for a disk. The RAC includes two types of nodes: a hub node and a leaf node. The hub node is a primary node in the cluster. The primary nodes are interconnected through a point-to-point network to process a distributed transaction. The leaf nodes are not connected to each other through the network and are configured to process concurrent query and an online reporting service.

However, the leaf node generally can only obtain data through the hub node as a proxy. Because the leaf node interacts with the hub node in a bilateral manner, the leaf node needs to wait for scheduling performed by an operating system, and obtain data on the hub node through a long access path. Consequently, the leaf node generally can read only historical data, and is difficult to meet a requirement of a real-time service for data consistency.

SUMMARY

This disclosure provides a transaction processing method. In the method, because global memory is shared, nodes, for example, a coordinating node and a participating node, in a distributed database system can unilaterally access the global memory across nodes. In this case, bilateral interaction is not required for data synchronization. Without processing performed by a processor and an operating system, an access path is greatly shortened. In addition, without scheduling performed by the operating system, synchronization time is greatly shortened. This implements real-time consistency between the coordinating node and the participating node, and meets a service requirement of a real-time service for real-time consistence. This disclosure further provides a distributed database system, a transaction processing system, a cluster, a computer-readable storage medium, and a computer program product that correspond to the foregoing method.

According to a first aspect, this disclosure provides a transaction processing method. The method may be performed by a distributed database system. The distributed database system may be deployed in a cluster. The cluster may be, for example, a memory engine cluster. When the distributed database system runs in the cluster, real-time consistency of data between nodes can be implemented, meeting a requirement of a real-time service. The distributed database system includes a coordinating node and a participating node. The coordinating node is responsible for coordination in a transaction execution process, and the participating node is responsible for execution in the transaction execution process. A transaction is a program execution unit that accesses and possibly updates data in a database, and generally includes a limited database operation sequence.

A part of memory of a plurality of nodes of the distributed database system is configured to form global memory. The global memory is visible to all coordinating nodes and participating nodes in the distributed database system. The remaining part of memory in the coordinating nodes or the participating nodes is local memory, and the local memory is visible to the coordinating nodes or the participating nodes. Any coordinating node or participating node can access, in a manner such as remote direct memory access or a memory bus, a part of memory of other nodes in the global memory.

The coordinating node is configured to receive a plurality of query statements sent by a client, create a transaction based on a first query statement in the plurality of query statements, execute the transaction in the global memory based on a second query statement in the plurality of query statements, and then submit the transaction based on a third query statement in the plurality of query statements, to implement consistency between the coordinating node and the participating node.

In the distributed database system, the global memory in the coordinating node or the participating node is shared. When the coordinating node executes the transaction and causes a change of data stored in the part of memory in the global memory, the participating node can quickly sense the change. The participating node can perform data synchronization by unilaterally accessing the part of memory in the global memory across nodes, rather than in a bilateral interaction manner. Without processing performed by a processor and an operating system, an access path is greatly shortened. Without scheduling performed by the operating system, synchronization time is greatly shortened. This implements real-time consistency between the coordinating node and the participating node, and meets a service requirement of a real-time service for real-time consistence. In addition, global memory capacity can be expanded as the node quantity increases, not limited by the memory capacity of a single node, thereby improving a concurrency control capability.

In some possible implementations, the distributed database system is deployed in a cluster, and the global memory comes from the cluster. The cluster refers to a computing network formed by at least one group of computers, and is configured to provide a computing capability for the distributed database system, so that the distributed database system provides a service externally based on the foregoing computing capability.

In the method, by using the global memory from the cluster, the nodes of the distributed database system can access the global memory unilaterally across nodes, without processing performed by the operating system and the processor or waiting for scheduling performed by the operating system, so that the real-time consistency between nodes (for example, between a coordinating node and a participating node) can be implemented.

In some possible implementations, the global memory includes a part of memory of the coordinating node and/or the participating node. A plurality of nodes (for example, each node) in the distributed database system may provide a part of memory for global memory, and the remaining memory is used for local memory of each corresponding node. The global memory is shared by nodes in the distributed database system. These nodes can directly implement unilateral access across the nodes through remote direct memory access or a memory bus, without using the operating system and the processor, or waiting for scheduling performed by the operating system, so that the real-time consistency between nodes can be implemented.

In some possible implementations, a node type of the coordinating node is a primary node. Correspondingly, the coordinating node can create a read/write transaction based on the first query statement in the plurality of query statements. In this way, a requirement of the real-time read/write service can be met.

In some possible implementations, a node type of the coordinating node is a first secondary node. The first secondary node is configured to keep real-time consistency with a node whose node type is a primary node. Based on this, the first secondary node may also be referred to as a real-time secondary node. Correspondingly, the coordinating node may create a read-only transaction based on the first query statement in the plurality of query statements. In this way, a requirement of the real-time read-only service can be met.

In some possible implementations, the distributed database system may further include a node whose node type is a second secondary node. The second secondary node is configured to keep quasi-real-time consistency with a node whose node type is a primary node. Therefore, the second secondary node may also be referred to as a quasi-real-time secondary node. The quasi-real-time secondary node is configured to process a service that has a low requirement for real-time performance, for example, a non-real-time analysis service. For example, the quasi-real-time secondary node is configured to receive a query statement associated with the non-real-time analysis service, and return a corresponding query result. In this way, a requirement of the non-real-time analysis service can be met.

In some possible implementations, before the coordinating node receives a plurality of query statements sent by a client, the distributed database system (for example, the coordinating node and the participating node in the distributed database system) may receive a quantity of copies that are of a table record sent by a cluster management node and that are in the global memory. The distributed database system then stores the quantity of copies that are of the table record and that are in the global memory.

In this way, when writing data, the distributed database system may write a corresponding quantity of copies based on the quantity of copies that are of the table record and that are in the global memory, thereby ensuring data security. The distributed database system can set a quantity of copies based on a table granularity, to meet personalized requirements of different services.

In some possible implementations, the table record is stored in the global memory of the distributed database system. An index tree and a management header of the table record are stored in the local memory of the distributed database system. In this method, the limited global memory is configured to store the table record, and the index tree and the management header of the table record are stored in the local memory for version management of the table record. In one aspect, the global memory can be unilaterally accessed across the nodes, and the real-time consistency between the nodes is ensured. In another aspect, the index tree or the like does not occupy the global memory, thereby improving resource utilization.

In some possible implementations, the coordinating node can submit the transaction based on a transaction submission protocol. The coordinating node submits the transaction based on the third query statement in the plurality of query statements according to the transaction submission protocol running on the coordinating node and the participating node, to implement the real-time consistency between the coordinating node and the participating node.

The protocol node and the participating node are constrained to the transaction submission protocol, so that transaction operations performed by the nodes (for example, the coordinating node and the participating node) that need to perform data write (including data insertion or update) are either completed at the same time or rolled back at the same time. In this way, a case of real-time inconsistency of nodes in which some copy nodes complete writing and the other copy nodes fail to perform writing is avoided, and the real-time consistency between nodes is further ensured.

In some possible implementations, when a write conflict occurs in the transaction, for example, when a read/write conflict or a write/write conflict occurs between the transaction and another transaction, the coordinating node triggers pessimistic concurrency control, and the participating node triggers optimistic concurrency control. A principle of the pessimistic concurrency control is as follows: it is assumed that concurrent transactions of a plurality of users affect each other when processed. Therefore, data can be modified by blocking one transaction. If the pessimistic concurrency control (pessimistic lock) is applied to an operation performed by a transaction, for example, reading a row of data, another transaction can perform a conflicting operation only after the transaction releases permission. A principle of the optimistic concurrency control is as follows: it is assumed that concurrent transactions of the plurality of users do not interfere with each other when processed, and each transaction can process affected data thereby without generating a lock. Before submitting the data update, each transaction checks whether another transaction modifies the data after the transaction reads the data. If another transaction is updated, the transaction that is being submitted is rolled back.

Through the foregoing concurrency control, in one aspect, the write-write conflict or the read/write conflict can be avoided, and the consistency between the coordinating node and the participating node can be ensured. In another aspect, interaction between the coordinating node and the participating node can be reduced, synchronization time can be shortened, and the real-time consistency can be implemented.

According to a second aspect, this disclosure provides a distributed database system. The distributed database system includes a coordinating node and a participating node, and the coordinating node and the participating node share global memory.

The coordinating node is configured to receive a plurality of query statements sent by a client; and the coordinating node is further configured to: create a transaction based on a first query statement in the plurality of query statements, execute the transaction in the global memory based on a second query statement in the plurality of query statements, and submit the transaction based on a third query statement in the plurality of query statements.

In some possible implementations, the distributed database system is deployed in a cluster, and the global memory comes from the cluster.

In some possible implementations, the global memory includes a part of memory of the coordinating node and/or the participating node.

In some possible implementations, a node type of the coordinating node is a primary node, and the coordinating node is configured to: create a read/write transaction based on the first query statement in the plurality of query statements.

In some possible implementations, a node type of the coordinating node is a first secondary node. The first secondary node is configured to keep real-time consistency with a node whose node type is a primary node, and the coordinating node is configured to: create a read-only transaction based on the first query statement in the plurality of query statements.

In some possible implementations, the coordinating node is further configured to receive and store a quantity of copies that are of the table record sent by the cluster management node and that are in the global memory; and the participating node is further configured to receive and store the quantity of copies that are of the table record sent by the cluster management node and that are in the global memory.

In some possible implementations, the table record is stored in the global memory of the distributed database system. An index tree and a management header of the table record are stored in the local memory of the distributed database system.

In some possible implementations, the coordinating node is configured to: submit, the transaction based on the third query statement in the plurality of query statements according to a transaction submission protocol running on the coordinating node and the participating node, to implement the real-time consistency between the coordinating node and the participating node.

In some possible implementations, the coordinating node is configured to trigger pessimistic concurrency control when a write conflict occurs in the transaction; and the participating node is configured to trigger optimistic concurrency control when a write conflict occurs in the transaction.

According to a third aspect, this disclosure provides a transaction processing system. The transaction processing system includes a client and the distributed database system according to any one of the implementations of the second aspect of this disclosure. The distributed database system is configured to perform a corresponding transaction processing method based on a query statement sent by the client.

According to a fourth aspect, this disclosure provides a cluster. The cluster includes a plurality of computers. The computer includes a processor and a memory. The processor and the memory communicate with each other. The processor is configured to execute instructions stored in the memory, so that the cluster performs the transaction processing method according to the first aspect or any one of the implementations of the first aspect.

According to a fifth aspect, this disclosure provides a computer-readable storage medium, where the computer-readable storage medium stores instructions, and the instructions instruct a computer to perform the transaction processing method according to the first aspect or any one of the implementations of the first aspect.

According to a sixth aspect, this disclosure provides a computer program product including instructions. When the computer program product runs on a computer, the computer performs the transaction processing method according to the first aspect or any one of the implementations of the first aspect.

Based on the implementations provided in the foregoing aspects, this disclosure may be further combined to provide more implementations.

BRIEF DESCRIPTION OF DRAWINGS

To describe the technical method in embodiments of this disclosure more clearly, the following briefly describes the accompanying drawings used in describing embodiments.

DESCRIPTION OF EMBODIMENTS

Figure 1:
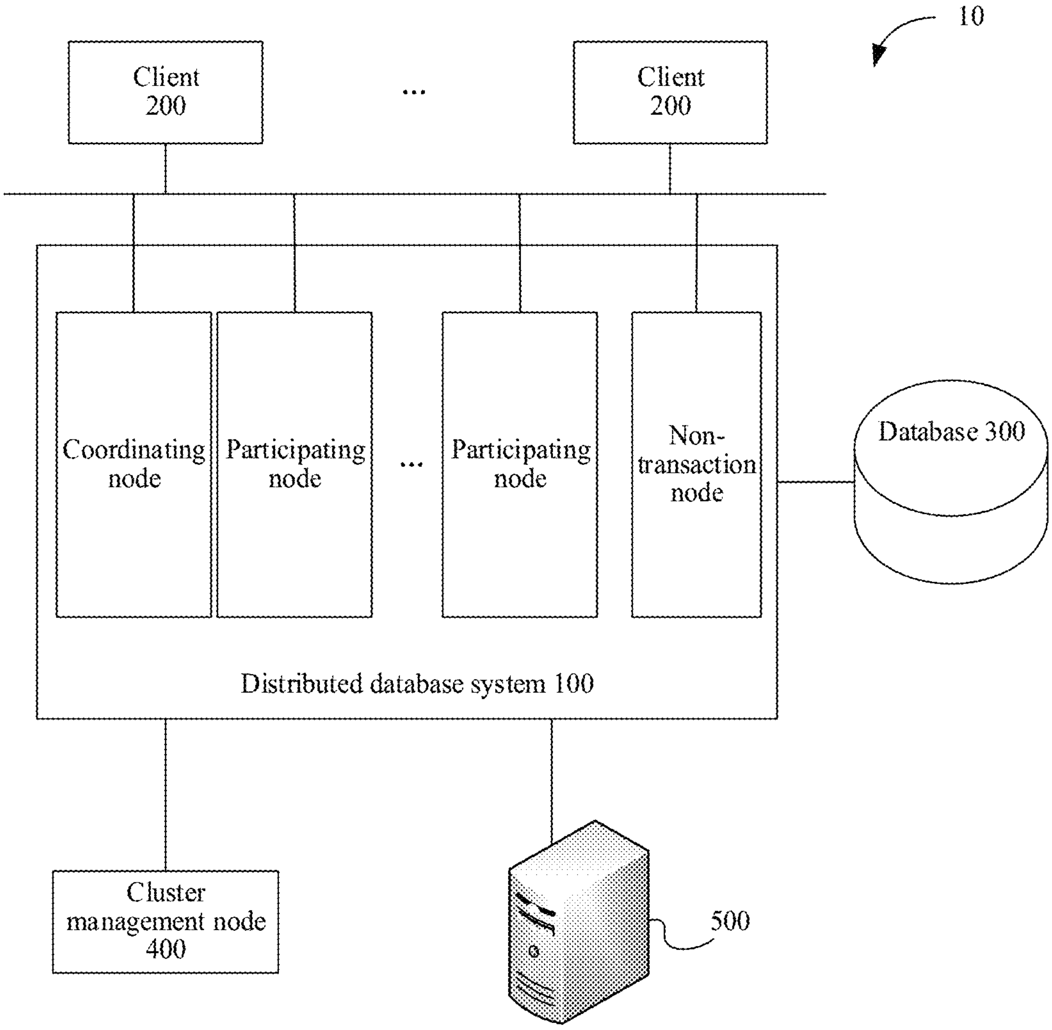
FIG. 1 is a diagram of a system architecture of a transaction processing system according to an embodiment of this disclosure.

The terms "first" and "second" in embodiments of this disclosure are merely for a purpose of description, and shall not be construed as indicating or implying relative importance or implying a quantity of indicated technical features. Therefore, a feature limited by "first" or "second" may explicitly or implicitly include one or more of the features.

For ease of understanding embodiments of this disclosure, some terms in this disclosure are first explained and described.

A database application refers to an application that provides a data management service for a user based on an underlying database. The data management service includes at least one of the following: data creation, data query, data update, data deletion, and the like. A typical database application includes an information management system such as an attendance management system, a salary management system, a production reporting system, and a securities trading system. The database application generally includes a database system and a user-oriented client. The user can trigger a data creation, query, update, or deletion operation through the client. The client can process data in the database through the database system accordingly in response to the foregoing operation.

The database system can be classified into a centralized database system and a distributed database system based on a deployment manner. The distributed database system is a database system deployed in a cluster including a plurality of computers. In this disclosure, a computer in the cluster may also be referred to as a node. Nodes can communicate with each other through a network, to collaboratively process the data.

The database system can determine, through a storage engine, a data storage manner in a storage medium, such as a memory or a disk, and a data reading manner. The storage engine is a core component of the database system. Different types of database systems can use different storage engines to provide different storage mechanisms, indexing modes, and lock mechanisms. When the database system is deployed on different nodes in a cluster in a distributed manner, the cluster may be further classified into a disk engine cluster and a memory engine cluster based on different types of storage media for storing data in the nodes in the cluster.

Currently, the widely used RAC in the industry is a distributed database storage engine cluster (for example, a disk engine cluster) based on a shared-everything data architecture for disks. The RAC includes two types of nodes: a hub node and a leaf node. The hub node is a primary node in the cluster. The primary node is interconnected to one another through a point-to-point network and is configured to process a distributed transaction. The leaf node is not connected through a network and is configured to process a concurrent query and an online reporting service. However, the leaf node generally can only obtain the data through the hub node as a proxy. The leaf node and the hub node obtain the data in the hub node through bilateral interaction. The bilateral interaction requires central processing units (CPU) of both parties to participate in processing, resulting in an excessively long access path. For example, the access path may be from a CPU of the leaf node to a network adapter of the leaf node, then to a network adapter of the hub node, then to a CPU of the hub node, and finally to a cache of the hub node. In addition, the foregoing interaction needs to wait for scheduling performed by an operating system, leading to a long delay. Generally, only historical data can be read on the leaf node, difficult to meet a requirement of a real-time service for data consistency.

In view of this, an embodiment of this disclosure provides a distributed database system. The distributed database system may be deployed in a cluster. The cluster may be, for example, a memory engine cluster. When the distributed database system runs in the cluster, real-time consistency of data between nodes can be implemented, meeting a requirement of a real-time service. The distributed database system includes a coordinating node and a participating node. The coordinating node is responsible for coordination in a transaction execution process, and the participating node is responsible for execution in the transaction execution process. A transaction is a program execution unit that accesses and possibly updates data in a database, and generally includes a limited database operation sequence.

A part of memory of a plurality of nodes of the distributed database system is configured to form global memory. The global memory is visible to all coordinating nodes and participating nodes in the distributed database system. The remaining part of memory in the coordinating node or the participating node is local memory, and the local memory is visible to the coordinating node or the participating node. Any coordinating node or participating node can access, in a manner such as remote direct memory access (RDMA) or a memory bus (memory fabric), a part of memory of another node in the global memory.

The coordinating node is configured to receive a plurality of query statements sent by a client, create a transaction based on a first query statement in the plurality of query statements, execute the transaction in the global memory based on a second query statement in the plurality of query statements, and then submit the transaction based on a third query statement in the plurality of query statements, to implement consistency between the coordinating node and the participating node.

In the distributed database system, the global memory in the coordinating node or the participating node is shared. When the coordinating node executes the transaction and causes a change of data stored in the part of memory in the global memory, the participating node can quickly sense the change. The participating node can perform data synchronization by unilaterally accessing the part of memory in the global memory across nodes through RDMA or a memory fabric, rather than the bilateral interaction manner. Without processing performed by a processor and the operating system, the access path is greatly shortened. Without scheduling performed by the operating system, synchronization time is greatly shortened. This implements the real-time consistency between the coordinating node and the participating node, and meets the service requirement of the real-time service for the real-time consistence. In addition, global memory capacity can be expanded as the node quantity increases, not limited by the memory capacity of a single node, thereby improving a concurrency control capability.

Based on the foregoing distributed database system, an embodiment of this disclosure further provides a transaction processing system. The following describes in detail the transaction processing system according to an embodiment of this disclosure with reference to the accompanying drawings.

Refer to a diagram of a system architecture of a transaction processing system shown in FIG. 1. The transaction processing system 10 includes a distributed database system 100, a client 200, and a database 300. The client 200 is connected to the distributed database system 100. The distributed database system 100 is connected to the database 300.

The distributed database system 100 includes a coordinating node and participating nodes. The coordinating node and the participating nodes can be connected through RDMA or a memory fabric of a high-speed network. The coordinating node and the participating nodes run a transaction submission protocol. The transaction submission protocol defines: the coordinating node is an access node of the transaction, and the participating nodes include a primary node and a first secondary node that are in the distributed database system 100 and that are other than the coordinating node.

The node type of the coordinating node may be a primary node or a first secondary node. The first secondary node is configured to keep real-time consistency with a node whose node type is a primary node. Therefore, the first secondary node is also referred to as a real-time secondary node. For example, for a read/write transaction, the node type of the coordinating node may be the primary node. For a read-only transaction, the node type of the coordinating node may be the real-time secondary node. It should be noted that the primary node has a capability of processing the read-only transaction. Therefore, for the read-only transaction, the node type of the coordinating node may also be the primary node.

In some possible implementations, the distributed database system 100 further includes a non-transaction node, for example, a second secondary node. The second secondary node is configured to keep quasi-real-time consistency with a node whose node type is a primary node. Therefore, the second secondary node is also referred to as a quasi-real-time secondary node. Considering that some services (for example, a non-real-time analysis service) have a low requirement for real-time performance, the distributed database system 100 can process these services through the second secondary node. For example, the second secondary node in the distributed database system 100 can receive a query statement associated with the non-real-time analysis service, and the second secondary node returns a query result based on the query statement.

A part of memory of a plurality of nodes (for example, each node) in the distributed database system 100 may be configured to form global memory. The global memory can implement memory addressing, memory application, and memory release management through a software module, for example, a global memory management module. The global memory management module may be a software module of the distributed database system 100.

The global memory management module may manage a memory of a node in the distributed database system 100. The global memory management module may support memory application and memory release of a single copy or a plurality of copies. The memory application and the memory release are in a byte level. Data that uses the single-copy global memory is usually cached on a node. If the node is faulty, the data cannot be accessed in the cache. In the takeover phase, the data can be accessed only after being loaded from the storage system. Data that uses the multi-copy global memory is usually cached on a plurality of nodes. When a node is faulty, another node can still be used for addressing and accessing. The global memory management module can provide application and release of a small memory block for global memory formed by the part of memory of the plurality of nodes. The global memory management module can provide a global memory interface. The global memory interface can be configured to apply for a small memory block of a specified length.

The single-copy memory or the multi-copy memory returned by the global memory interface is uniformly addressed by the global memory management module. An address of the single-copy memory or the multi-copy memory is referred to as a global memory address GmAddr. For a specified global memory address, any node in the distributed database system 100 can access data at the address. Further, the global memory management module may further determine a node identity and an offset position of a corresponding node based on the global memory address. Local or remote read/write access can be implemented based on the node identity and the offset position.

The client 200 may be a general-purpose client such as a browser, or a dedicated client such as a client of various information management systems. A user may write a query statement through the client 200 based on a query language, for example, a Structured Query Language (SQL). The distributed database system 100 (for example, a coordinating node in the distributed database system 100) receives a plurality of query statements, can create a transaction based on a first query statement in the plurality of query statements, then execute the transaction in the global memory based on a second query statement in the plurality of query statements, and then submit the transaction based on a third query statement in the plurality of query statements for data creation, data query, data update, and/or data deletion. For the global memory visible to both the coordinating node and the participating nodes, the real-time consistency between the coordinating node and the participating nodes can be ensured. In addition, the transaction submission protocol running on the coordinating node and the participating nodes enables operations of the transaction to be performed simultaneously or rolled back simultaneously. This further ensures the real-time consistency between the coordinating node and the participating nodes.

The database 300 is configured to persistently store the data. For example, the database 300 may persistently store log data. When a node in the distributed database system 100 recovers from a fault, or the distributed database system 100 is powered on and recovered as a whole, the distributed database system 100 can load data from the database 300 to the memory.

It should be noted that the database 300 may be a database in a shared storage system. The shared storage system includes any one or a plurality of the following: a raw device, an automatic storage management (ASM) device, or a network attached storage (NAS) device. The shared storage system has an access sharing capability. A node in the distributed database system 100 can be connected to the shared storage system and access the shared storage system. The shared storage system can use a cross-node copy or a cross-node erasure code to ensure data reliability and ensure atomicity of a data write. Atomicity refers to that all operations in a transaction are completed or no operations are completed. The transaction does not end in an intermediate phase. If an error occurs in the transaction execution process, the transaction is rolled back to the status before the transaction begins.

In this embodiment, the distributed database system 100 may be deployed in a cluster. For example, the distributed database system 100 may be deployed in a memory engine cluster. Correspondingly, the transaction processing system 10 may further include a cluster management node 400. The cluster management node 400 is connected to the distributed database system 100.

The cluster management node 400 is configured to operate and maintain the cluster (for example, a distributed database system 100 in the cluster). The cluster management node 400 can be configured to discover a node in the distributed database system 100, and manage a status of the node in the distributed database system 100, or manage metadata. The metadata can include at least one of node attribute information and a data table schema. The node attribute information includes any one or a plurality of the following: a node identity (ID), a node Internet Protocol (IP) address, a node type, and a node state. The data table schema includes any one or a plurality of the following: a table name, a table ID, a table type, a field quantity, a field type description, and the like.

In some possible implementations, the transaction processing system 10 further includes a time server 500. The time server 500 is connected to the distributed database system 100. The time server 500 is configured to provide a monotonically increasing clock service. The clock may be a logical clock, a true time clock, or a mixed logical clock. The hybrid logical clock is a logical clock that is mixed with a physical clock (for example, a real time). The time server 500 may provide a time stamp of a current moment for the distributed database system 100. The time stamp can be a time-representing value with a length of 8 bytes or 16 bytes. The distributed database system 100 may obtain a time stamp to determine visibility of the transaction to the data.

Before processing the transaction, the distributed database system 100 can be installed first. In a process of installing the distributed database system 100, a user can be prompted to configure a node in the distributed database system 100. For ease of understanding, the following describes a node configuration method according to an embodiment of this disclosure with reference to the accompanying drawings.

Figure 2:
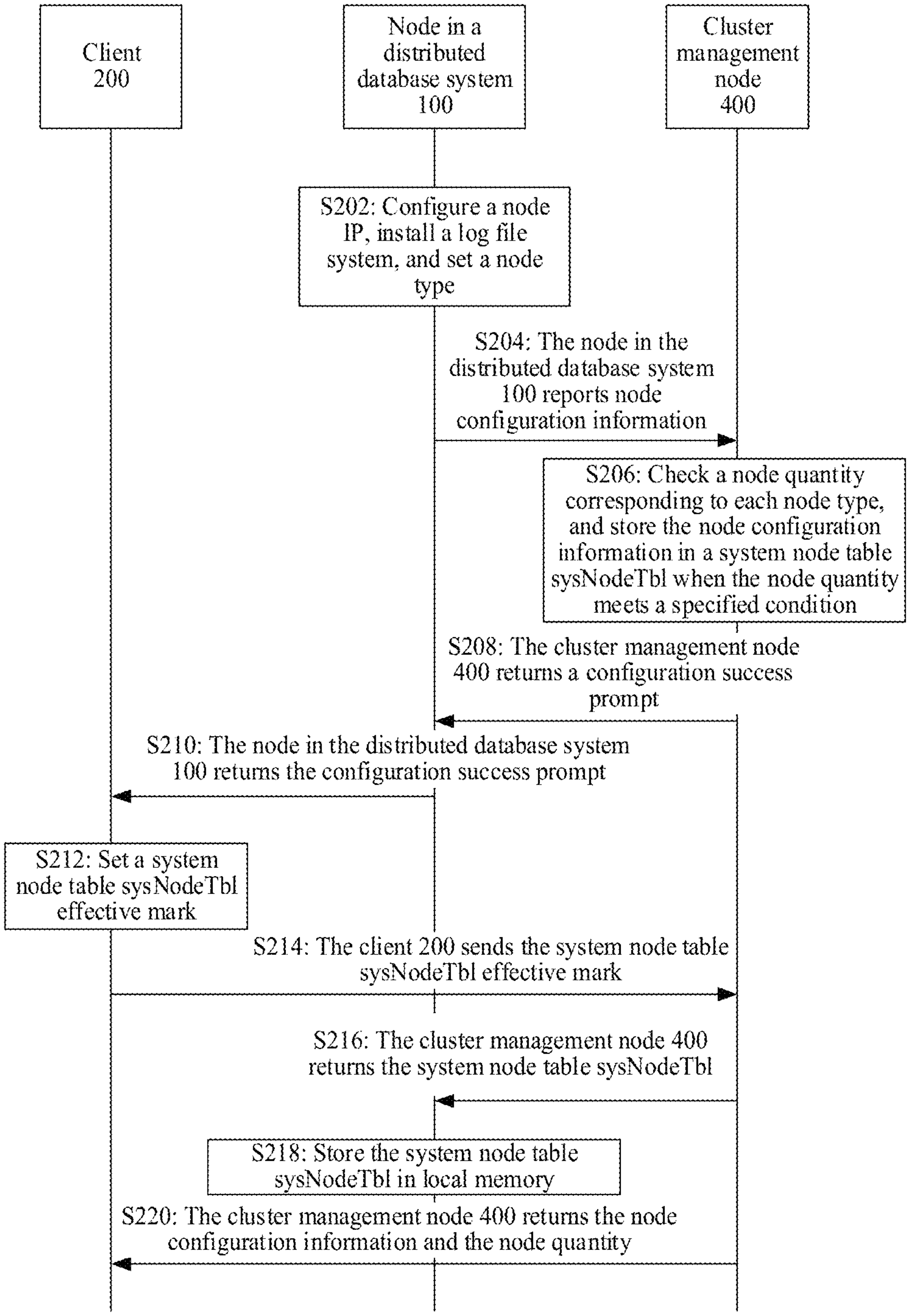
FIG. 2 is a flowchart of a node configuration method according to an embodiment of this disclosure.

Refer to a flowchart of interaction of a node configuration method shown in FIG. 2.

The method includes the following steps.

Step S202: A node in a distributed database system 100 configures a node IP, installs a log file system, and sets a node type.

The distributed database system 100 may include a plurality of nodes. A node IP can be automatically configured based on an IP address pool for any node. In some embodiments, the node may also receive a node IP manually configured by an administrator, so that the node IP is configured.

Similarly, a node can automatically configure a node type, or receive a node type manually configured by the administrator, so that the node type is configured. The node type may include a primary node and a real-time secondary node. Further, the node type may include a quasi-real-time secondary node. In some embodiments, the primary node may be configured to process a read/write transaction. The real-time secondary node may be configured to process a read-only transaction. The quasi-real-time secondary node may be configured to process a non-transaction request, for example, a query request associated with an analysis service. In this way, requirements of different services can be met.

Considering that memory in the distributed database system 100 is a volatile storage medium, to ensure persistency of transaction-related data, a transaction submission success notification message can be returned to a client 200 after a log file of the transaction, for example, a redolog is persistently stored. Direct writing of the log file into a shared storage system (for example, a database in the shared storage system) may lead to a longer transaction submission delay. As a result, the transaction is processed quickly on the distributed database system 100 side, but the persistent storage of the log file takes more time. This affects an overall delay and performance.

Therefore, some nodes (for example, the primary node) in the distributed database system 100 can further be configured with a high-speed persistent medium for the persistent storage of the log file. The high-speed persistent medium includes but is not limited to a power-saving memory, a non-volatile random-access memory (NVRAM), or another non-volatile 3D-point medium. A log file system (LogFs) can be installed on the node to manage local high-speed persistent media. The log file system can also provide a file semantic access interface for the persistent storage of the log file including the redolog file.

Further, the real-time secondary node can also be configured with the high-speed persistent medium, so that when the primary node is faulty, the node type of the real-time secondary node can be changed to the primary node. The quasi-real-time secondary node is mainly configured to process the non-transaction request and does not need persistent local storage of the log file. Therefore, the high-speed persistence media configuration is not required.

Because a data amount of the redolog file expands as a quantity of submitted transactions increases, the redolog file may be migrated from the log file system to the shared storage system through a background task (for example, a task triggered by a node in the distributed database system 100) and written into the shared storage system. The migration process is completed by the background task and does not affect a transaction execution delay.

It should be noted that a capacity requirement of the high-speed persistent medium is smaller. For example, if the transaction processing capability of a single node is 1 million transactions per second, the data volume of the log files such as the redolog file is 1 gigabyte (GB) per second, and the background task is migrated every 0.5 seconds, the high-speed persistent medium capacity only needs to be 1 GB to the write redolog file in one node. Before the redolog file is migrated to the shared storage system, it can be written into a plurality of nodes to ensure reliability. For example, if the data is written to three nodes, the capacity of the high-speed persistent storage medium can be configured as 3 GB (1 GB*3).

Based on the foregoing structure of the distributed database system 100, the distributed database system 100 can be logically divided into an index layer, a table record layer, and a near-end persistence layer. The index layer is configured to store an index tree of a table record in a data table and a management header rhead in the table record. Herein, rhead is configured to record a global memory address and a log file address, for example, a redolog file address, that are of the table record of the version. The index layer is usually implemented through local memory, and is accessed locally. The index tree and rhead exist on all nodes in the distributed database system 100. The index tree and rhead on the primary node and the real-time secondary node are consistent in real time. Consistent data is formed when transaction submission is completed. The table record layer is configured to store the table record of the data table. The table record layer is usually implemented through global memory and can be accessed through remote access, such as RDMA or a memory fabric. The local persistence layer is configured to persistently store the log file such as the redolog file. The near-end persistence layer is usually implemented through the high-speed persistent medium.

Step S204: The node in the distributed database system 100 reports node configuration information to a cluster management node 400.

The node configuration information may include the node IP and the node type. Further, the node configuration information may further include any one or a plurality of the following: a memory capacity and a log file system capacity.

Step S206: The cluster management node 400 checks a node quantity corresponding to each node type, and stores the node configuration information in a system node table sysNodeTbl when the node quantity meets a specified condition.

The distributed database system 100 includes at least the primary node. In some possible implementations, the distributed database system 100 further includes at least one of the real-time secondary node or the quasi-real-time secondary node. Based on this, the cluster management node 400 can check whether a primary node quantity Nm meets the following specified condition: Nm>0. Optionally, the cluster management node 400 can check whether the real-time secondary node quantity Nr and the quasi-real-time secondary node quantity Nq meet the following specified conditions: Nr≥0, and Nq≥0.

Further, considering a cost of expanding the distributed database system 100, a sum of the primary node quantity Nm and the real-time secondary node quantity Nr is usually specified with an upper limit value, and the upper limit value may be a first preset value Q1. Similarly, the quasi-real-time secondary node quantity Nq is also specified with an upper limit value, and the upper limit value may be a second preset value Q2. Based on this, the cluster management node 400 can check whether the sum of the primary node quantity Nm and the real-time secondary node quantity Nr meets a following specified condition: Nm+Nr≤Q1, and check whether the quasi-real-time secondary node quantity Nq meets a following specified condition: Nq≤Q2. Q1 and Q2 can be set based on an empirical value. For example, Q1 may be set to 8, and Q2 may be set to 64.

When the node quantity (for example, a single-node quantity and/or a sum of quantity of nodes of different types) meets a specified condition, the node configuration is indicated to be valid, and the cluster management node 400 can store the node configuration information in the system node table sysNodeTbl.

Step S208: The cluster management node 400 returns a configuration success prompt to the node in the distributed database system 100.

Step S210: The node in the distributed database system 100 returns a configuration success prompt to the client 200.

The cluster management node 400 returns the configuration success prompt to each node in the distributed database system 100, and each node returns the configuration success prompt to the client 200.

It should be noted that, when the node quantity does not meet the specified condition, for example, the node quantity exceeds the upper limit value, or the node quantity is less than the lower limit value, the node configuration fails. Correspondingly, the cluster management node 400 can further return a configuration failure prompt, to re-configure the node.

Step S212: The client 200 sets a system node table sysNodeTbl effective mark.

Step S214: The client 200 sends the system node table sysNodeTbl effective mark to the cluster management node 400.

The effective mark is configured to identify the system node table sysNodeTbl. The client 200 sets the effective mark, and sends the effective mark to the cluster management node 400, so that the system node table sysNodeTbl can be validated.

Step S216: The cluster management node 400 returns the system node table sysNodeTbl to the node in the distributed database system 100.

Step S218: The node in the distributed database system 100 stores the system node table sysNodeTbl.

Step S220: The cluster management node 400 returns the node configuration information to the client 200.

The cluster management node 400 returns the node configuration information of each node to the client 200, for example, the node IP and the node type of each node. In this way, the client 200 may not only obtain the node configuration information, but also obtain the node quantity based on the node configuration information of each node, for example, the node quantity of each node type.

It should be noted that Step S210 to Step S220 are optional steps of the node configuration method according to an embodiment of this disclosure. In another possible implementation of this disclosure, Step S210 to Step S220 may not be performed.

After the node configuration is completed, you can also configure a quantity RecordMemRepNum of copies that are of the table record and that are in the global memory. The minimum value of RecordMemRepNum is 1. Considering the data in the primary node and the real-time secondary node in the distributed database system 100 keeps consistent in real time, if the quantity of copies in the global memory exceeds a sum of the primary node quantity Nm and the real-time secondary node quantity Nr, namely, Nm+Nr, memory consumption is increased, but availability is not improved. Based on this, a maximum value can be set to Nm+Nr.

If a service has a high requirement on the recovery time, RecordMemRepNum can be set to a value greater than 1. In this way, when a node is faulty, and the table record cached on the node cannot be accessed, a coordinating node or a participating node in a normal state can still directly access the table record from memory of the memory copy node of the data table. In this case, a recovery time objective (RTO) of 0 is used.

If a service has a low requirement on the recovery time, RecordMemRepNum can be set to 1. In this way, when a node is faulty, another node (for example, a coordinating node or a participating node in a normal state) cannot access a table record cached on the faulty node. In this case, a transaction that accesses the table record can wait for a node in the distributed database system 100 to take over the faulty node and recover from the shared storage system, or continue execution after a log file such as a redolog file is replayed. In this case, RTO>0.

When RecordMemRepNum is configured, an information prompt can further be provided for the user, for example, a minimum value and a maximum value of RecordMemRepNum, so that the user configures with reference to the minimum value and the maximum value. After the configuration is completed, the cluster management node 400 may further use RecordMemRepNum as a table attribute, stored in a system metadata table sysMetaTbl. The node in the distributed database system 100 can also update the system metadata table sysMetaTbl in the local memory.

The following describes, with reference to the accompanying drawings, a RecordMemRepNum configuration method according to an embodiment of this disclosure.

Figure 3:
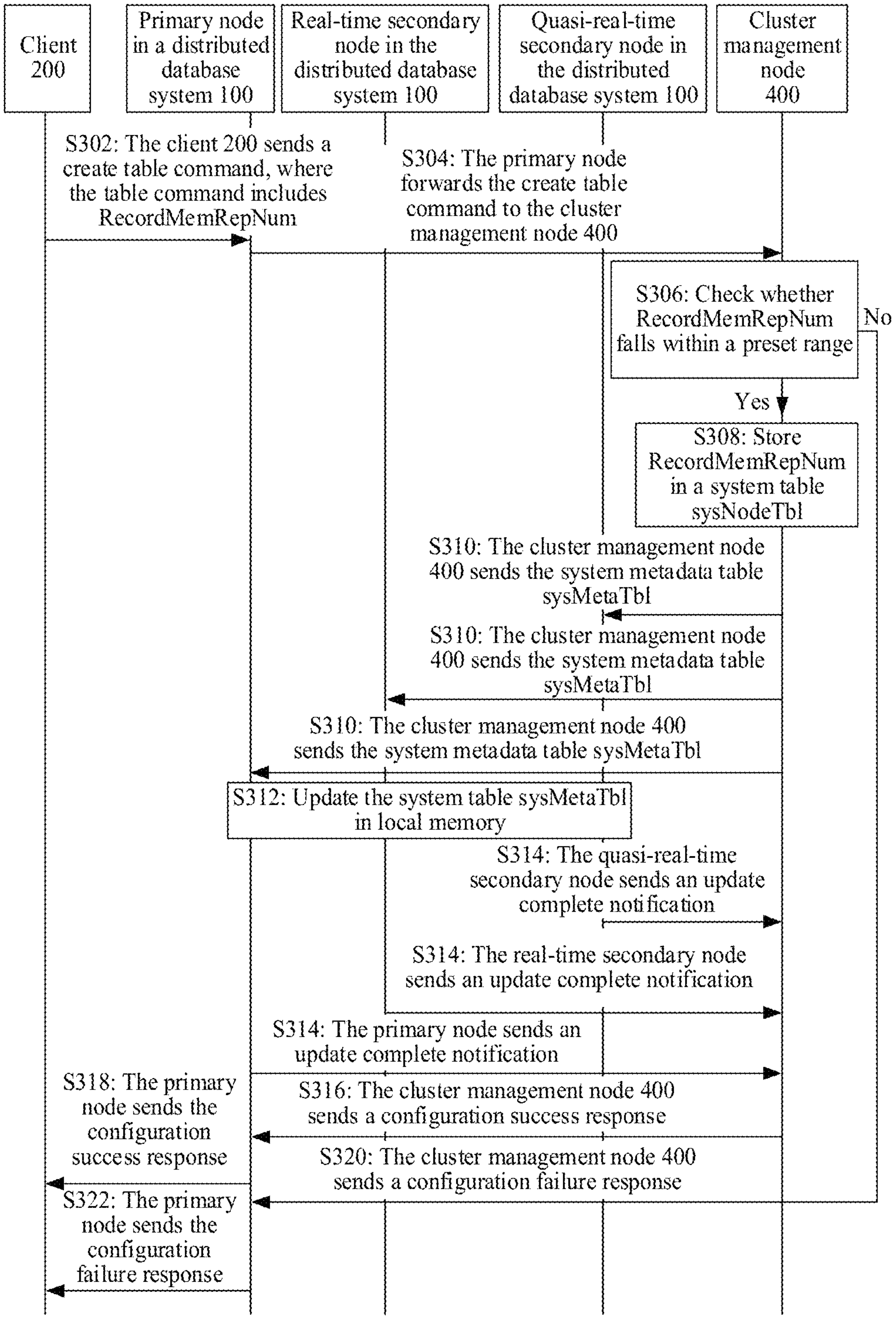
FIG. 3 is a flowchart of a copy quantity configuration method according to an embodiment of this disclosure.

Refer to a flowchart of interaction of a RecordMemRepNum configuration method shown in FIG. 3. The method includes the following steps.

Step S302: The client 200 sends a create table command to the primary node in the distributed database system 100, where the table command includes RecordMemRepNum.

The create table command includes a table parameter, and the table parameter may include the quantity of copies that are of the table record and that are in the global memory, that is, RecordMemRepNum. In some possible implementations, the table parameter may further include one or a plurality of the following: a table name, a column name, and a column type.

Step S304: The primary node forwards the create table command to the cluster management node 400.

The primary node can perform the create table command to create the data table. In addition, the primary node further forwards the create table command, for example, forwards the RecordMemRepNum parameter in the create table command to the cluster management node 400, to set RecordMemRepNum.

In this way, RecordMemRepNum, the quantity of copies that are of the table record and that are in the global memory can be configured through the data table as a granularity, to meet availability requirements of different data tables. The memory consumption can be controlled based on a requirement of the data table.

S306: The cluster management node 400 checks whether RecordMemRepNum falls within a preset range, and if yes, performs step S308, or if no, performs step S320.

The preset range is a value range of RecordMemRepNum. The range may be greater than or equal to 1 and less than or equal to the sum of the primary node quantity Nm and the real-time secondary node quantity Nr, namely, Nm+Nr. The Cluster management node 400 checks whether RecordMemRepNum is greater than or equal to 1 and less than or equal to Nm+Nr. If yes, it indicates that configured RecordMemRepNum is valid, and S308 can be performed. If no, it indicates that configured RecordMemRepNum is invalid, and S320 can be performed.

S308: The cluster management node 400 stores RecordMemRepNum in the system metadata table sysMetaTbl.

The cluster management node 400 adds a table record to the system metadata table sysMetaTbl. The table record is configured to record RecordMemRepNum. The cluster management node 400 can persistently store the foregoing data in the table record.

Step S310: The cluster management node 400 sends the system metadata table sysMetaTbl to the primary node, the real-time secondary node, and the quasi-real-time secondary node.

The cluster management node 400 can send the system metadata table sysMetaTbl to the node in the distributed database system 100. When the distributed database system 100 does not include the real-time secondary node or the quasi-real-time secondary node, the step of sending the system metadata table sysMetaTbl to the real-time secondary node or the quasi-real-time secondary node may also not be performed.

Step S312: The primary node, the real-time secondary node, and the quasi-real-time secondary node in the distributed database system 100 update the system metadata table sysMetaTbl in the local memory.

Step S314: The primary node, the real-time secondary node, and the quasi-real-time secondary node in the distributed database system 100 send an update complete notification to the cluster management node 400.

The update complete notification is configured to notify the cluster management node 400 that the update of the system metadata table sysMetaTbl is completed in the local memory of each node in the distributed database system 100.

Step S316: The cluster management node 400 sends a configuration success response to the primary node in the distributed database system 100.

Step S318: The primary node sends the configuration success response to the client 200.

In some possible implementations, the cluster management node 400 may also directly send the configuration success response to the client 200, to notify the client 200 that the configuration of the RecordMemRepNum has been completed.

Step S320: The cluster management node 400 sends a configuration failure response to the primary node in the distributed database system 100.

Step S322: The primary node sends the configuration failure response to the client 200.

In some possible implementations, the cluster management node 400 may also directly send the configuration failure response to the client 200, to notify the client 200 that the configuration of the RecordMemRepNum has failed. Based on this, the client 200 may also adjust the table parameter and resend the create table command.

It should be noted that Step S314 to Step S322 are optional steps of the RecordMemRepNum configuration method according to an embodiment of this disclosure. In another possible implementation of this disclosure, Step S314 to Step S322 may not be performed.

After the node configuration and the configuration of the quantity of copies that are of the table record and that are in the global memory are completed, the transaction can be processed may be performed based on the foregoing transaction processing system 10. The following describes in detail the transaction processing method according to an embodiment of this disclosure with reference to the accompanying drawings.

Figure 4:
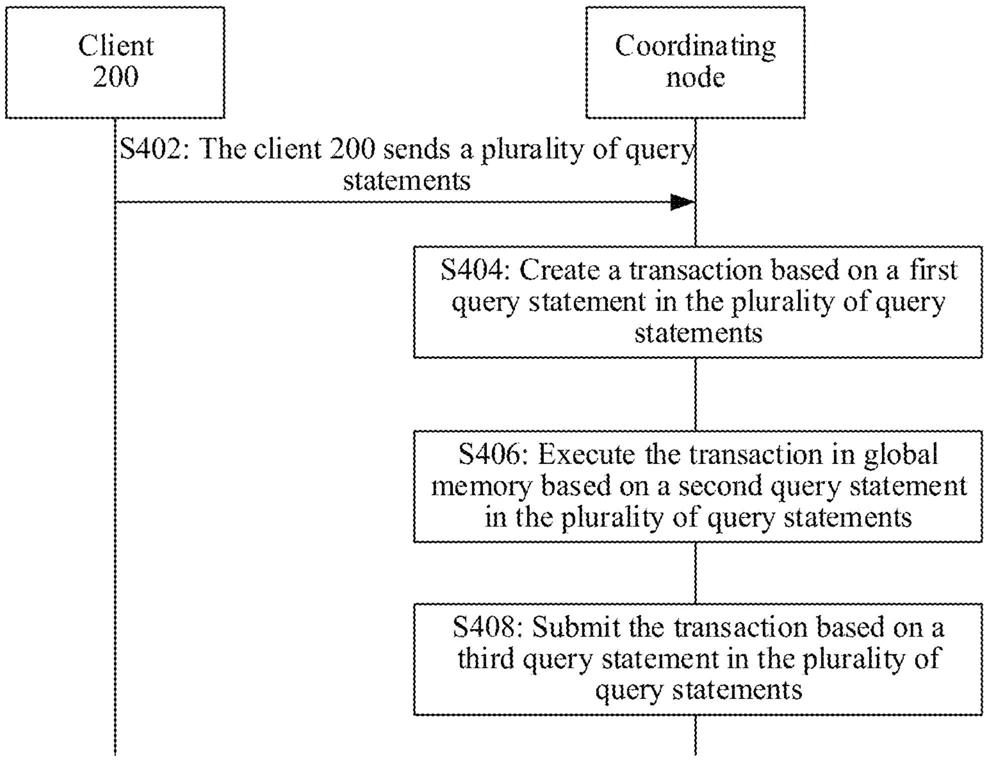
FIG. 4 is a flowchart of interaction of a transaction processing method according to an embodiment of this disclosure.

Refer to a flowchart of a transaction processing method shown in FIG. 4. The method includes the following steps.

Step S402: The client 200 sends the plurality of query statements to the coordinating node in the distributed database system 100.

The query statement is a statement that is written through a query language and that is configured to process data in the database 300. Data processing in the database 300 includes any one or a plurality of the following: data creation, data query, data update, data deletion, and the like.

The client 200 can receive the plurality of query statements written by a user through the query language, and then send the plurality of query statements to the coordinating node in the distributed database system 100. The query language can be determined by the user from a list of query languages supported by the database 300. For example, the query language may be SQL. Correspondingly, the query statement written by the user may be an SQL statement.

When sending the plurality of query statements, the client 200 can send the plurality of query statements at a time. In this way, a throughput rate can be improved. In some possible implementations, the client 200 may alternatively send the query statements one by one. The client 200 may first send a query statement, and then send a next query statement after the query statement is executed.

In some possible implementations, a plurality of query statements may be configured to form a transaction. The client 200 determines a transaction type based on the query statement. The transaction type includes a read/write transaction and a read-only transaction. The read-only transaction does not support an operation such as insert, delete, and update. The client 200 may determine, based on whether the query statement indicates to insert, delete, or update the table record, that the transaction type is the read/write transaction or the read-only transaction. For example, if at least one of the query statements indicates to insert, delete, or update the table record, the client 200 may determine that the transaction type is the read/write transaction; otherwise, the transaction type is determined to be the read-only transaction.

When the transaction type is the read/write transaction, the client 200 can determine the coordinating node from the primary node of the distributed database system 100, and send the plurality of query statements to the coordinating node. When the type of the transaction is the read-only transaction, the client 200 can determine the coordinating node from the real-time secondary nodes of the distributed database system 100, and send the plurality of query statements to the coordinating node. In some possible implementations, when the transaction type is the read-only transaction, the client 200 may alternatively determine the coordinating node from the primary node. This is not limited in an embodiment of this disclosure.

Step S404: The coordinating node in the distributed database system 100 creates a transaction based on the first query statement in the plurality of query statements.

The first query statement may be a query statement indicating that the transaction begins. For example, when the first query statement is an SQL query statement, the first query statement may include a begin command. The coordinating node can execute the first query statement, to create the transaction. When the node type of the coordinating node is the primary node, the coordinating node may create the read/write transaction based on the first query statement. When the node type of the coordinating node is the real-time secondary node, the coordinating node may create the read-only transaction based on the first query statement.

Figure 5:
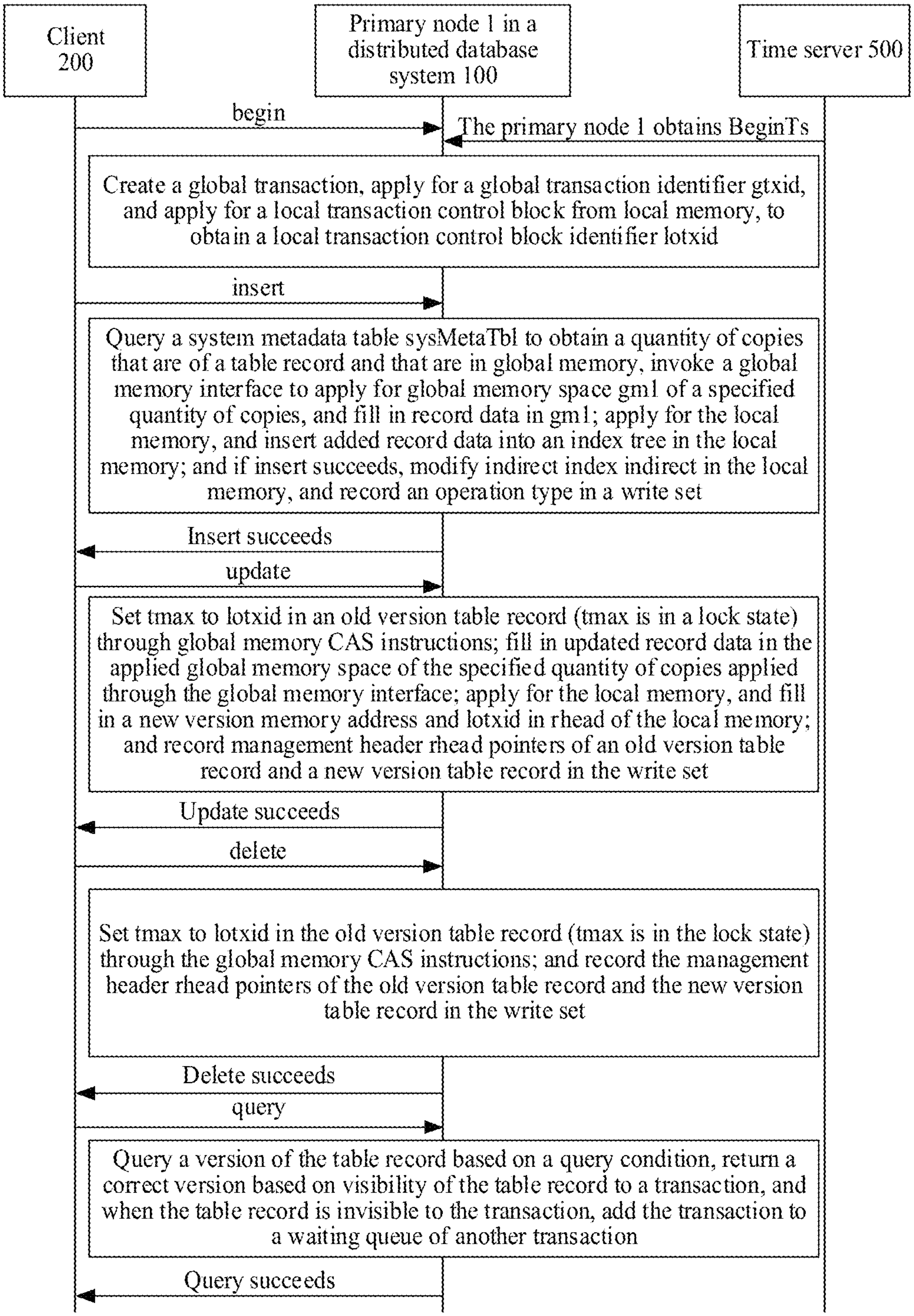
FIG. 5 is a flowchart of a transaction begin and execution phase according to an embodiment of this disclosure.

Refer to a flowchart of a transaction begin phase shown in FIG. 5. The coordinating node (for example, a primary node 1 in the distributed database system 100) can create the transaction based on the first query statement (begin shown in FIG. 5) indicating that the transaction begins. The coordinating node can create a global transaction, apply for a global transaction identifier gtxid, and apply for a local transaction control block from the local memory, to obtain a local transaction control block identifier lotxid. In addition, the coordinating node may further obtain a begin time stamp (begin time stamp, beginTs) from the time server 500.

gtxid can be determined based on the node identity and a sequence number in the node, for example, may be a character string obtained by combining the node identity and the sequence number in the node. The global transaction includes a plurality of sub-transactions (for example, local transactions on the coordinating node and the participating nodes), and the plurality of sub-transactions can be associated through gtxid. When the coordinating node has an exception and is taken over by another node, the other participating node can query the cluster management node 400 for a node identity of the takeover node through the node identity in gtxid, to initiate a global transaction status re-confirmation process to the takeover node.

The local transaction control block is a segment of memory space used for process status control in the local memory. The identifier of the local transaction control block, that is, lotxid, may be a value that is strictly monotonically increasing, and the value may be a value of 8 bytes. Herein, lotxid can be recorded in rhead of the index layer. When another transaction on the node needs to wait for the transaction to be submitted, the transaction can be found based on lotxid and the other transaction can be added to the waiting queue of the transaction.

The transaction begin time stamp, namely, beginTs, can be recorded in the local transaction control block, and is configured to provide a basis for determining transaction visibility. When the transaction begins, the coordinating node obtains the current time stamp from the time server 500 as beginTs. The coordinating node can determine, based on the begin time stamp and through a visibility rule, the visibility of the table record to the transaction. The following describes in detail a process of determining the visibility based on the visibility rule.

An rhead of a table record of a version includes a time window for survival of the table record of the version. The time window for survival can be represented by a minimum time stamp tmin representing a begin time and a maximum time stamp tmax representing an end time. The coordinating node can determine, based on a value relationship between beginTs of a transaction and tmin and tmax in rhead of a table record of a version, visibility of the table record of the version to the transaction.

When both tmin and tmax record time stamps (not gtxid), if beginTs is greater than or equal to tmin and beginTs is less than tmax, the table record of the version is visible to the transaction. Otherwise, the table records are invisible to the transaction. When at least one of tmin or tmax records gtxid (not a time stamp), the coordinating node may find the local transaction based on lotxid recorded in rhead, and add the transaction to the waiting queue of the local transaction. After the transaction wakes up from the waiting queue, tmin and tmax are read to determine the visibility.

Step S406: The coordinating node in the distributed database system 100 executes the transaction in the global memory based on the second query statement in the plurality of query statements.

The second query statement may be a query statement that indicates a transaction operation. The transaction operation includes a data manipulation language (DML) operation. The DML operation may include an insert operation, a delete operation, or an update operation. The transaction operation may also include a query operation.

When the second query statement is a statement that indicates performing the insert operation, the second query statement may further carry record data of a to-be-inserted table record. When the second query statement is a statement that indicates performing the update operation, the second query statement may further carry a primary key of a to-be-updated table record and updated record data. When the second query statement is a statement that indicates performing a delete operation, the second query statement may further carry a primary key of a table record. When the second query statement is a statement that indicates performing a query operation, the second query statement may further carry a query condition. The query condition may include a primary key or a predicate condition of a table record. The predicate is configured to represent a comparison operation, and the predicate condition includes a query condition expressed through the comparison operation. The predicate condition is configured to narrow a range of a result set returned by the query.

The coordinating node may execute the second query statement, to execute the transaction in the global memory. For example, the coordinating node may execute at least one of operations such as data insertion, deletion, update, or read in the global memory. The second query statement may include one or more second query statements. The following describes a transaction execution process in which the second query statement respectively indicates performing an insert operation, a delete operation, an update operation, and a query operation.

Refer to a flowchart of a transaction execution phase shown in FIG. 5. When the second query statement is the statement that indicates performing the insert operation, the coordinating node (for example, the primary node 1 in the distributed database system 100) may query the system metadata table sysMetaTbl to obtain a table attribute, where the table attribute includes the quantity of copies that are of the table record and that are in the global memory. The quantity of copies that are of the table record and that is in the global memory may be denoted as RecordMemRepNum. The coordinating node may invoke the global memory interface provided by the global memory management module to apply for global memory space with a specified quantity of copies (for example, may be denoted as gm1), and then fill in the record data in gm1. The specified quantity of copies is equal to the value of RecordMemRepNum.

The coordinating node may invoke the global memory interface to obtain a node list in which the gm1 copy is located, and then fill in, based on the node list in which the copy is located, added record data in global memory of a node (for example, the coordinating node) of the first copy. Herein, tmin is set to gtxid, and tmax is set to −1 (used to represent infinite). It should be noted that tmin is set to gtxid before submission, and is set to a time stamp after the submission. Herein, tmax remains unchanged before and after the submission.

Further, the coordinating node may query a system node table sysNodeTbl. If a quasi-real-time secondary node exists in the node list in which the copy is located, the added record data continues to be filled in the global memory of the quasi-real-time secondary node. Herein, tmin is set to gtxid, and tmax is set to −1.

The coordinating node can also apply for local memory to store rhead and indirect index indirect. The global memory address, a physical address, and lotxid of the record data of insert are filled in rhead. Because the transaction has not been committed, the physical address may be 0. Herein, indirect points to rhead. Then, the coordinating node inserts the added record data into the local index tree. If a key conflict occurs, the insert operation fails and the previously applied global memory and the local memory is released. The coordinating node can further return error information. The error information can indicate that the insert operation fails. Further, the error information can indicate a reason why the insert operation fails. If insert succeeds, indirect is modified to point to the added record data. The coordinating node may record the operation type as insert in the local transaction write set (wset), and return an insert success notification to the client 200. The local transaction write set is referred to as a write set for short below.

When the second query statement is the statement that indicates performing the update operation, the coordinating node (for example, the primary node 1 in the distributed database system 100) may query the system metadata table sysMetaTbl to obtain the table attribute, where the table attribute includes RecordMemRepNum. The coordinating node queries the version of the table record of the update operation, determines whether the table record is visible to the transaction based on tmin and tmax in beginTs and rhead, and returns the table record of the correct version.

The coordinating node searches, based on the primary key of the table record of the update operation, index data such as an index tree for a version linked list, to be specific, a rhead linked list, of the table record. Then, the coordinating node reads, based on the global memory address recorded in rhead, tmin and tmax that are corresponding to the table record, and determines the visibility based on tmin and tmax. If tmin or tmax in this version is gtxid instead of the time stamp, the transaction is added to the waiting queue of the local transaction control block identified by lotxid in rhead. After the transaction is woken up, a process of traversing rhead linked list can be executed again. Herein, gtxid or the time stamp can be distinguished through a high-order bit. If a high-order bit of tmin or tmax is 1, tmin or tmax is gtxid. If the high-order bit of tmin or tmax is not 1, tmin or tmax is the time stamp. If tmin or tmax in the version are both time stamps, when beginTs is within [tmin, tmax), the table record of the version is indicated to be visible to the transaction, and the coordinating node can return the table record and rhead of the version. When beginTs is not within [tmin, tmax), the table record of the version is indicated to be invisible to the transaction, and the coordinating node may continue to traverse a previous version based on an address of the previous version recorded by rhead.

The coordinating node can obtain the global memory address of the table record based on rhead of the returned version, and then attempt to mark the update in the table record based on the global memory address. If tmax of the returned version is not −1, it indicates that the version is not the current version and has been updated by another transaction, in other words, a write-write conflict occurs. The coordinating node can return a mark failure notification to the client 200. If tmax of the returned version is −1, it indicates that the version is the latest version. The coordinating node may invoke the global memory interface to obtain a node list of memory copies, initiate a compare and swap (CAS) atomic operation on tmax of a corresponding table record in global memory of a first copy node, and mark tmax as gtxid. If the CAS atomic operation fails to return, it indicates that the write-write conflict occurs, and the mark failure notification is returned to the client 200. If the CAS atomic operation manages to return, it indicates a successful mark, and the coordinating node can update the table record.

When updating the table record, the coordinating node can first invoke the global memory interface to apply for global memory with a specified quantity of copies, and then fill in the updated record data. For specific implementation of applying for the global memory by the coordinating node and filling in the updated record data in the global memory, refer to related content description of the insert operation. Details are not described herein again. Then, the coordinating node applies for the local memory for storing rhead, where the global memory address, lotxid, and the physical address of the updated table record is filled in rhead. In this case, the physical address may be 0.

Then, the coordinating node installs the new version chain, specifically, points the management header newrhead of the updated table record to the address of rhead of the previous version, and points indirect to newrhead. The coordinating node records, in the write set wset in the local transaction control block, that the operation type is update, and records the address of rhead (in other words, oldrhead) and the address of newrhead. When completing the foregoing operations, the coordinating node can return an update success notification to the client 200.

When the second query statement is a statement that indicates performing the delete operation, the coordinating node (for example, the primary node 1 in the distributed database system 100) may search for the version of the to-be-deleted table record, determine visibility of the table record to the transaction based on tmin and tmax in beginTs and rhead, and return a table record of a correct version. Then, the coordinating node obtains the global memory address of the table record based on rhead of the returned version, and marks the update in the table record. For specific implementation of determining, by the coordinating node, visibility, returning the table record of the correct version, and marking the update, refer to related content description of the update operation. Details are not described herein again.

Then, the coordinating node records, in the write set in the local transaction control block, that the operation type is delete, and records the address of rhead. When completing the foregoing operations, the coordinating node can return a deletion success notification to the client 200.

When the second query statement is a statement that indicates performing a query operation, the coordinating node (for example, the primary node 1 in the distributed database system 100) may search for a version of a table record of query based on a query condition, determine visibility of the table record to a transaction based on tmin and tmax in beginTs and rhead, and return a table record of a correct version. For specific implementation of determining, by the coordinating node, the visibility and returning the table record of a correct version, refer to related content description of the update operation. The coordinating node can then also traverse read records in the local transaction read set (rset) and check the phantom to verify the read/write conflict. When the verification is passed, the table record of the correct version can be returned to respond to the query operation. The local transaction read set may be referred to as a read set for short below.

After the foregoing processing, for the insert/update operation, the coordinating node has applied for the global memory with the specified quantity of copies for the new version of the table record, filled in the record data of the table record for the first copy node (for example, the coordinating node), and set tmin and tmax. If the copy node includes the quasi-real-time secondary node, record data of a table record is further filled for the quasi-real-time secondary node, and tmin and tmax are set. In addition, the coordinating node applies for rhead for the new version of the table record, where rhead records global memory address of the recorded data or updated record data, and has been installed in the local index tree and indirect. For the update/delete operation, tmax of the first copy node in an original version has already been CAS to gtxid. In this way, a concurrent conflict with another transaction can be processed. Addresses of gtxid, beginTs, and newrhead have been recorded in the write set in the local transaction control block. The read record and the query condition (for example, the predicate condition) have been recorded in the read set in the local transaction control block. The read record may be used for read/write conflict verification.

Step S408: The coordinating node in the distributed database system 100 submits the transaction based on the third query statement in the plurality of query statements.

The third query statement can be a query statement that indicates submitting the transaction. For example, when the third query statement is the SQL query statement, the third query statement may include a commit command. The coordinating node can execute the third query statement, to submit the transaction. The coordinating node can execute the third query statement, to submit the transaction, so that the added record data, the updated record data, the deleted record data, or the queried record data keep real-time consistency between the coordinating node and the participating node.

Figure 6:
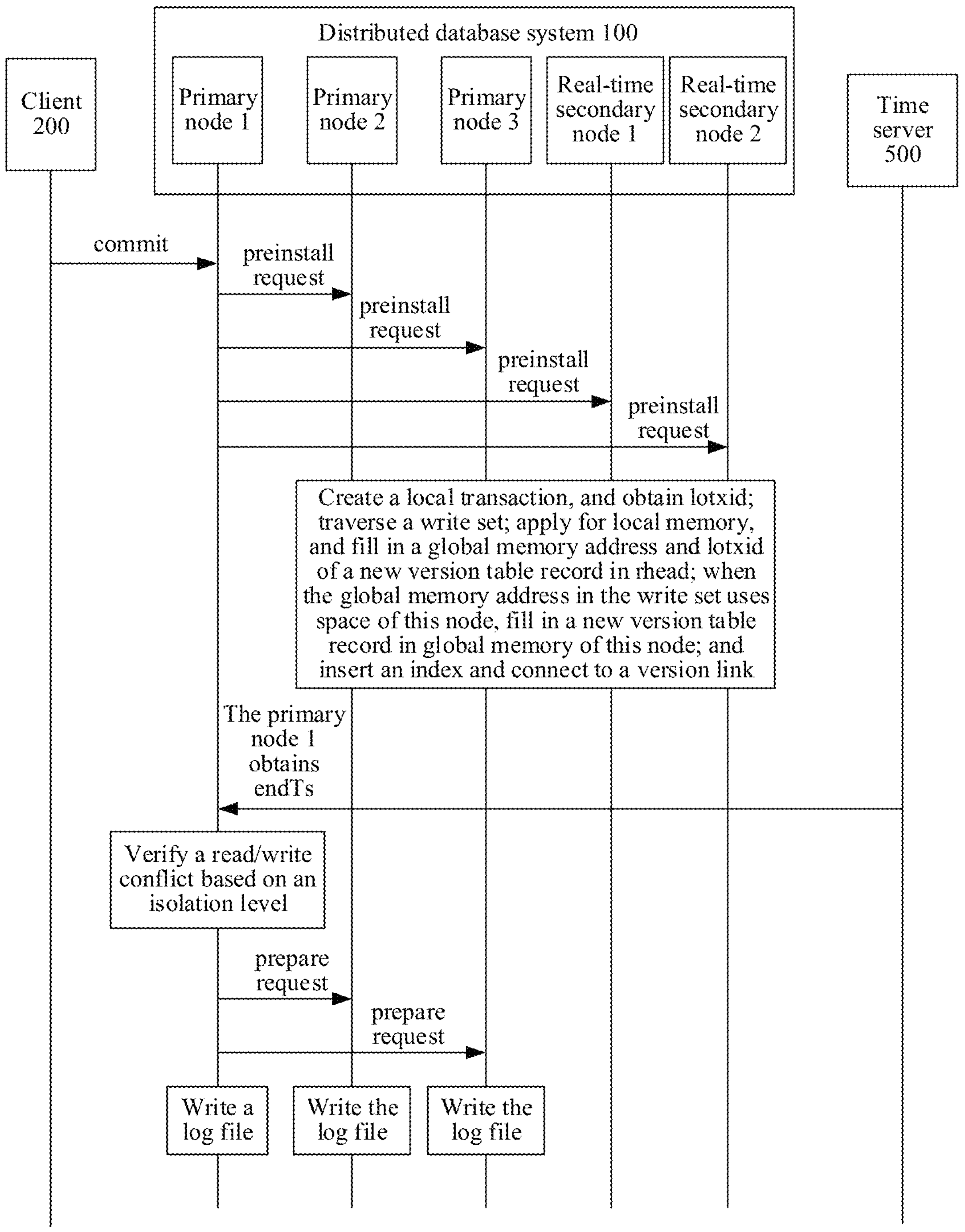
FIG. 6 is a flowchart of a transaction submission phase according to an embodiment of this disclosure.

Refer to a flowchart of a transaction submission phase shown in FIG. 6. The coordinating node (for example, the primary node 1 in the distributed database system 100) may query a locally cached system node table sysNodeTbl to obtain another primary node list and a real-time secondary node list, and these nodes are participating nodes. The coordinating node packs, based on an operation type (for example, one or a plurality of insert, update, and delete) the address of newrhead, and an address of oldrhead in the write set, the operation type, the global memory address recorded in the old version table record and the new version table record, and the record data recorded in the new version table record into a pre-synchronization (also referred to as Preinstall) request message. The pre-synchronization request includes gtxid and beginTs. The coordinating node sends the pre-synchronization request message to the participating nodes (for example, a primary node 2, a primary node 3, a real-time secondary node 1, and a real-time secondary node 2 in the distributed database system 100). Each participating node receives the pre-synchronization request message, creates a local transaction on the node, and obtains lotxid.

The participating node traverses a write set in the pre-synchronization request message, and processes as follows based on the operation type:

For the insert operation, the participating node applies for local memory for the new version. The local memory is configured to store the newrhead. The participating node records, in the newrhead, the global memory address, loxid, and the physical address that are carried in the pre-synchronization request message, where the physical address is 0, and then assigns a value to indirect to point to the newrhead. Then, the participating node checks whether the global memory address of the new version has a copy in the node. If a copy exists and the copy is not the first copy, record data is filled in the copy of the node. Herein, tmin is set to gtxid, and tmax is set to −1. Finally, the participating node inserts the new record data into the index tree based on the primary key of the new record data. If a key conflict occurs, the participating node sends a pre-synchronization failure notification to the coordinating node. Otherwise, the insert operation is successful. It should be noted that, in this case, if another transaction finds the record data, the transaction is added to the waiting queue of the local transaction control block corresponding to lotxid in rhead.

For the update operation, the participating node applies for local memory for the new version. The local memory is configured to store the newrhead. The participating node records, in the newrhead, the global memory address, loxid, and the physical address carried in the pre-synchronization request message. In this case, the physical address is 0. Then, the participating node checks whether the global memory address of the new version has a copy in the node. If a copy exists and the copy is not the first copy, record data is filled in the copy of the node. Herein, tmin is set to gtxid, and tmax is set to −1. Then, the participating node searches the local index number for indirect address based on the primary key recorded in the old version table record, obtains rhead to which the indirect points based on the address, and points the newrhead to the current rhead. When the participating node checks, based on the global memory address of the data recorded in the old version, that the node has a copy and the copy is not the first copy in the global memory, tmax may be changed to gtxid in the copy of the node.

For the delete operation, the participating node searches the local index tree for the indirect address based on the primary key recorded in the old version table record, obtains rhead to which the indirect points, and points the newrhead to the current rhead. Then, when the participating node checks, based on the global memory address of the data recorded in the old version, that the node has a copy and the copy is not the first copy in the global memory, tmax may be changed to gtxid in the copy of the node.

Then, the participating node sends a pre-synchronization response message to the coordinating node. When the coordinating node gathers pre-synchronization response messages sent by all participating nodes, and the pre-synchronization response messages all mark that the pre-synchronization succeeds, the coordinating node obtains the current time stamp as an end time stamp endTs.

The coordinating node may determine an isolation level of a transaction. When the isolation level of the transaction is a serializable snapshot isolation (SSI) level, the coordinating node may check the read/write conflict. The coordinating node can traverse the read set rset, and use endTs to check visibility of a table record corresponding to rhead in the rset, to determine whether the read/write conflict occurs. The coordinating node may re-execute a query of the table record based on the predicate condition, and check whether a table record visible based on endTs and a record visible based on beginTs are the same. If yes, it indicates that there is no read/write conflict in the table record covered by the predicate condition in the transaction execution process. If a table record is invisible, it indicates that another transaction modifies the table record, in other words, the read/write conflict occurs. The coordinating node can terminate the transaction, perform a rollback operation, notify another participating node to terminate the transaction, and return an error response to the client 200. It should be noted that, when the isolation level of the transaction is another isolation level such as read committed (RC) or snapshot isolation (SI), the coordinating node may not perform this step, to check the read/write conflict.

The coordinating node obtains, based on the node configuration information in the system node table, a node list configured with a log file system such as LogFs. The coordinating node may select, based on a preset quantity of copies, a corresponding node quantity from the list to write a log file. For example, a preset quantity of copies is N, and the coordinating node may write a log file, and send a synchronization request (also referred to as a prepare request) to other N−1 nodes configured with LogFs, to notify the foregoing nodes to write a log file (for example, a redolog file). This log file records gtxid, endTs, the added record data, the global memory address, and the deleted record data. Then, the coordinating node waits for a synchronization response from the foregoing node. If the redolog does not meet a requirement of the quantity of copies set in advance, for example, the quantity of copies that is set in advance to 3, and the node quantity configured with the high-speed persistent medium is 2, the coordinating node may directly write the redolog into the shared storage system. When determining RC or SI of the transaction, the coordinating node may directly generate a log file, for example, a redolog file.

After receiving the synchronization request, the participating node writes the log file (for example, the redolog file) in a same name as the local logFs file, and sends a synchronization response to the coordinating node. Before writing the log file, the participating node may also first verify the read/write conflict and the write/write conflict. For a process of verifying the read/write conflict by the participating node, refer to a specific implementation of verifying the read/write conflict by the coordinating node. The participating node may verify the write-write conflict in the following manner: the participating node determines, based on an index of at least one table record in the write set of the transaction, whether the write-write conflict occurs. For example, if a uniqueness conflict occurs when a participating node inserts a write record index entry into an index, it indicates that the write-write conflict occurs. When determining that the write-write conflict does not occur, the participating node generates a redolog file. When determining that the write-write conflict occurs, the participating node can return an error response to the coordinating node. After receiving a synchronization response (also referred to as a commit reply), the coordinating node may enter a transaction complete process.

Figure 7:
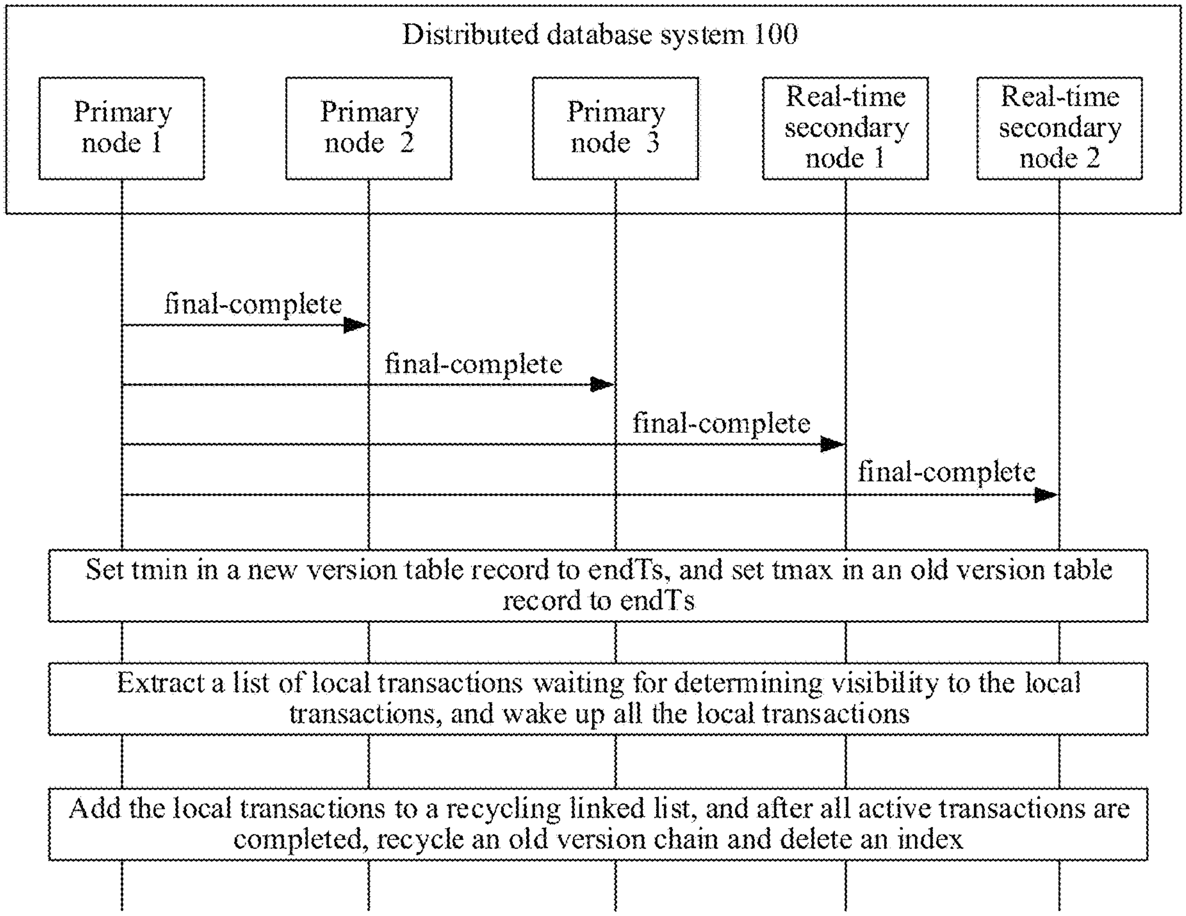
FIG. 7 is a flowchart of a transaction complete phase according to an embodiment of this disclosure.

Refer to a flowchart of a transaction complete phase shown in FIG. 7. The coordinating node (for example, the primary node 1 in the distributed database system 100) sends a transaction complete request to each participating node (for example, the primary node 2, the primary node 3, the real-time secondary node 1, and the real-time secondary node 2 in the distributed database system 100), where the transaction complete request carries loxid of each participating node. The coordinating node traverses the write set in the local transaction and applies the modification of the current transaction.

The coordinating node can apply the modification of the current transaction by setting tmin to endTs, and setting a physical address in rhead to a redolog file identity and an offset position in a first copy and a quasi-real-time secondary node copy (if there is a quasi-real-time secondary node copy) of a new version table record in the global memory. Then, the coordinating node sets tmax to endTs, and updates a physical address in rhead to a redolog file identity and an offset position in a first copy and a quasi-real-time secondary node copy (if there is a quasi-real-time secondary node copy) of an old version table record in the global memory. The coordinating node sets lotxid of rhead records in all write sets to 0. In this case, the coordinating node extracts a list of local transactions waiting for determining the visibility to the local transactions, and wakes up all the local transactions. The woken transaction re-checks the visibility of the table record. The coordinating node adds the local transactions to a recycling linked list. After all active transactions are completed, the coordinating node recycles an old version chain and deletes the index.

After receiving the transaction complete request, the participating node uses a processing manner similar to the processing manner of the coordinating node. The participating node traverses the write set, and applies the modification of the current transaction. If the new version table record in the write set has a copy on the node, the participating node sets tmin to endTs and sets the physical address in rhead to the redolog file identifier and the offset position in the new version table record. The participating node further sets tmax to endTs, and updates a physical address in rhead to a redolog file identity and an offset position in the old version table record in the write set. The participating node sets lotxid of all rhead records in the write set to 0. In this case, the participating node extracts the list of local transactions waiting for determining the visibility to the local transactions, and wakes up all the local transactions. The participating node adds the local transactions to the recycling linked list. After all active transactions are completed, the coordinating node recycles the old version chain and deletes the index. The participating node may then complete responding to a transaction of the coordinating node.

It should be noted that when the coordinating node verifies the read/write conflict based on the isolation level, if a table record is invisible, it indicates that another transaction modifies the table record, and the read/write conflict occurs. The coordinating node can terminate the transaction and roll back the transaction. In some embodiments, when the coordinating node receives the pre-synchronization response of the participating node, if the pre-synchronization response includes the error response, the coordinating node may also terminate the transaction and roll back the transaction. The following describes in detail the rollback process.

Figure 8:
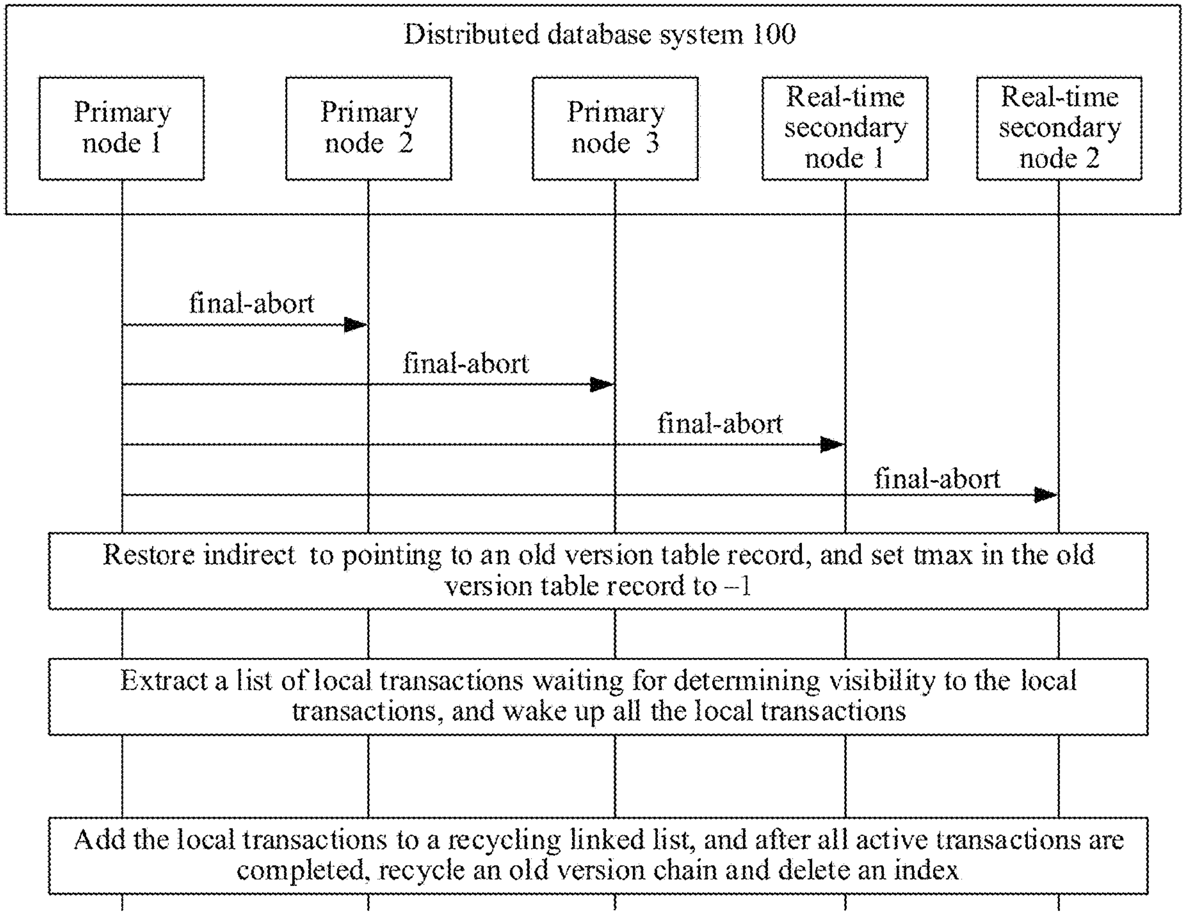
FIG. 8 is a flowchart of a transaction rollback phase according to an embodiment of this disclosure.

Refer to a flowchart of a transaction rollback phase shown in FIG. 8. The coordinating node (for example, the primary node 1 in the distributed database system 100) sends a transaction rollback request (for example, final-abort shown in FIG. 8) to each participating node (for example, the primary node 2, the primary node 3, the real-time secondary node 1, and the real-time secondary node 2 in the distributed database system 100), where the transaction rollback request carries lotxid of each participating node. The coordinating node traverses the write set in the local transaction and rolls back the modification of the transaction. The coordinating node deletes an index of the new version table record in the write set from the index tree, sets tmax to −1 in the first copy and the quasi-real-time secondary node copy (if there is a quasi-real-time secondary node copy) of the old version table record in the write set in the global memory, restores indirect of the old version table record in the write set to point to the old version, and sets lotxid of rhead records in all the write sets to 0. In this case, the coordinating node extracts a list of local transactions waiting for determining the visibility to the local transactions, and wakes up all the local transactions. It should be noted that the woken transaction re-checks the visibility of the record. Then the coordinating node adds the local transactions to the recycling linked list. After all active transactions are completed, the coordinating node recycles the global memory and the local memory of the new version table record.

After receiving the transaction rolled back request, the participating node may use a processing manner similar to the processing manner of the coordinating node. The participating node traverses the write set, and applies the modification of the current transaction. If the global memory of the old version table record in the write set has a copy in the node, tmax is set to −1, indirect of the old version table record in the write set is restored to pointing to the old version, and lotxid of rhead records in all the write sets is restored to 0. In this case, the participating node extracts the list of local transactions waiting for determining the visibility to the local transactions, and wakes up all the local transactions. The participating node adds the local transactions to the recycling linked list. After all active transactions are completed, the coordinating node recycles the global memory and the local memory of the new version table record.

For the query operation, the coordinating node (the node type is a primary node or a real-time secondary node) can determine the visible version and directly return the record data of the table record to the client. When the transaction isolation level is SSI, the table record is not submitted (when tmin or tmax indicates gtxid, it indicates that the table record is not submitted), and beginTs of the transaction is greater than beginTs of a local transaction corresponding to the record that is not submitted, the coordinating node may add the transaction to a waiting queue of another transaction. Otherwise, record data of the table record is directly returned.

In some possible implementations, the distributed database system 100 further includes the quasi-real-time secondary node. The quasi-real-time secondary node may receive the query request that is sent by the client and that is associated with the analysis service, and locally generate the index tree and the data copy by replaying a redolog. The quasi-real-time secondary node may replay all redolog periodically (for example, at an interval of 0.5 seconds), replay and generate, through content and the global memory address of the table record recorded in redolog, record data of the local index tree and the new version table record.

To ensure the consistency of the replayed redolog content, the quasi-real-time secondary node can use a minimum endTs of all active transactions in the cluster as a replay end time. A transaction log with a time stamp smaller than endTs in the redolog is replayed.

In this embodiment, the transaction submission protocol defines a write conflict (the write-write conflict or the read/write conflict) control method. The coordinating node uses pessimistic concurrency control (also referred to as a pessimistic lock), and the participating node uses optimistic concurrency control (also referred to as an optimistic lock). In one aspect, the write/write conflict or the read/write conflict can be avoided, and the consistency between the coordinating node and the participating node can be ensured. In another aspect, interaction between the coordinating node and the participating node can be reduced, so that synchronization time can be shortened, and the real-time consistency can be implemented.

A principle of the pessimistic concurrency control is as follows: it is assumed that concurrent transactions of a plurality of users affect each other when processed. Therefore, data can be modified by blocking one transaction. If the pessimistic concurrency control (pessimistic lock) is applied to an operation performed by a transaction, for example, reading a row of data, another transaction can perform a conflicting operation only after the transaction releases permission. A principle of the optimistic concurrency control is as follows: it is assumed that concurrent transactions of the plurality of users do not interfere with each other when processed, and each transaction can process affected data thereby without generating a lock. Before submitting the data update, each transaction checks whether another transaction modifies the data after the transaction reads the data. If another transaction is updated, the transaction that is being submitted is rolled back.

Based on the foregoing content description, an embodiment of this disclosure provides a transaction processing method. In this method, a part of memory of the plurality of nodes of the distributed database system 100 is configured to form the global memory. The global memory is visible to the coordinating node and the participating node in the distributed database system 100. To be specific, the global memory in the coordinating node or the participating node is shared. When the coordinating node executes the transaction, and causes a change of data stored in the part of memory in the global memory, the participating node can quickly sense the change. The participating node can perform data synchronization by accessing the part of memory in the global memory across nodes through RDMA or a memory fabric, rather than the message interaction manner. In this way, the synchronization time is greatly shortened. This implements the real-time consistency between the coordinating node and the participating node, and meets the service requirement of the real-time service for the real-time consistence. In addition, global memory capacity can be expanded as the node quantity increases, not limited by the memory capacity of a single node, thereby improving a concurrency control capability.

Compared with another disk engine cluster oriented to a disk medium, the memory engine cluster oriented to a memory medium according to an embodiment of this disclosure has no page and no rollback log, contributing to a better performance. In addition, an embodiment of this disclosure provides different types of nodes such as the primary node, the real-time secondary node, and the quasi-real-time secondary node, to meet a requirement of a real-time read/write service (for example, a requirement of a transaction scenario), a requirement of a real-time read-only service (for example, a requirement of a real-time analysis scenario), or a requirement of a non-real-time read-only service (for example, a requirement of a non-real-time analysis scenario). In an embodiment of this disclosure, a quantity of copies that are of a table record and that are in the global memory may be further set based on a table granularity. Memory occupation can be controlled, and high availability requirements of different data tables can be met.

The foregoing describes in detail the transaction processing method according to an embodiment of this disclosure with reference to FIG. 1 to FIG. 8. The following describes, with reference to the accompanying drawings, the distributed database system 100 and the transaction processing system 10 according to an embodiment of this disclosure.

Refer to a schematic diagram of a structure of a distributed database system 100 shown in FIG. 1. The distributed database system 100 includes: a coordinating node, configured to receive a plurality of query statements sent by a client, where the coordinating node is further configured to: create a transaction based on a first query statement in the plurality of query statements, execute the transaction in the global memory based on a second query statement in the plurality of query statements, and submit the transaction based on a third query statement in the plurality of query statements.

In some possible implementations, the distributed database system is deployed in a cluster, and the global memory comes from the cluster.

In some possible implementations, the global memory includes a part of memory of the coordinating node and/or the participating node.

In some possible implementations, a node type of the coordinating node is a primary node, and the coordinating node is configured to: create a read/write transaction based on the first query statement in the plurality of query statements.

In some possible implementations, a node type of the coordinating node is a first secondary node. The first secondary node is configured to keep real-time consistency with a node whose node type is a primary node, and the coordinating node is configured to: create a read-only transaction based on the first query statement in the plurality of query statements.

In some possible implementations, the coordinating node is further configured to receive and store the quantity of copies that are of the table record sent by the cluster management node and that are in the global memory; and the participating node is further configured to receive and store the quantity of copies that are of the table record sent by the cluster management node and that are in the global memory.

In some possible implementations, the table record is stored in the global memory of the distributed database system. An index tree and a management header of the table record are stored in the local memory of the distributed database system.

In some possible implementations, the coordinating node is configured to: submit, the transaction based on the third query statement in the plurality of query statements according to a transaction submission protocol running on the coordinating node and the participating node, to implement the real-time consistency between the coordinating node and the participating node.

In some possible implementations, the coordinating node is configured to trigger pessimistic concurrency control when a write conflict occurs in the transaction; and the participating node is configured to trigger optimistic concurrency control when a write conflict occurs in the transaction.

The distributed database system 100 according to an embodiment of this disclosure may correspondingly perform the method described in embodiments of this disclosure, and the foregoing and other operations and/or functions of the modules/units of the distributed database system 100 are separately used to implement corresponding processes of each method in an embodiment shown in FIG. 4. For brevity, details are not described herein again.

Based on the distributed database system 100 according to an embodiment of this disclosure, an embodiment of this disclosure further provides a transaction processing system 10. Refer to a schematic diagram of a structure of a transaction processing system 10 shown in FIG. 1. The transaction processing system 10 includes a distributed database system 100 and a client 200.

The distributed database system 100 is configured to perform a corresponding transaction processing method based on a query statement sent by the client 200, for example, execute the transaction processing method shown in FIG. 4. The client 200 is configured to send a plurality of query statements to the distributed database system 100. The coordinating node of the distributed database system 100 is configured to: receive the plurality of query statements, create a transaction based on a first query statement in the plurality of query statements, execute the transaction in the global memory based on a second query statement in the plurality of query statements, and submit the transaction based on a third query statement in the plurality of query statements.

In some possible implementations, the transaction processing system 10 further includes a database 300. The distributed database system 100 executes a transaction processing method, to manage data in the database 300, for example, insert new record data, update the record data, or delete the record data.

Similarly, the transaction processing system 10 further includes a cluster management node 400. The cluster management node 400 is configured to configure a node of a distributed database system deployed in a cluster, for example, configure a node IP, a node type, and the like. The transaction processing system 10 may further include a time server 500. The time server 500 is configured to provide a time stamp for the distributed database system 100, to determine visibility of data to a transaction based on the time stamp.

An embodiment of this disclosure further provides a cluster 90. The cluster 90 includes a plurality of computers. The computer may be a server, for example, a local server in a private data center, or a cloud server provided by a cloud service provider. The computer may also be a terminal. The terminal includes but is not limited to a desktop computer, a notebook computer, a smartphone, and the like. The cluster 90 is configured to implement a function of the distributed database system 100.

Figure 9:
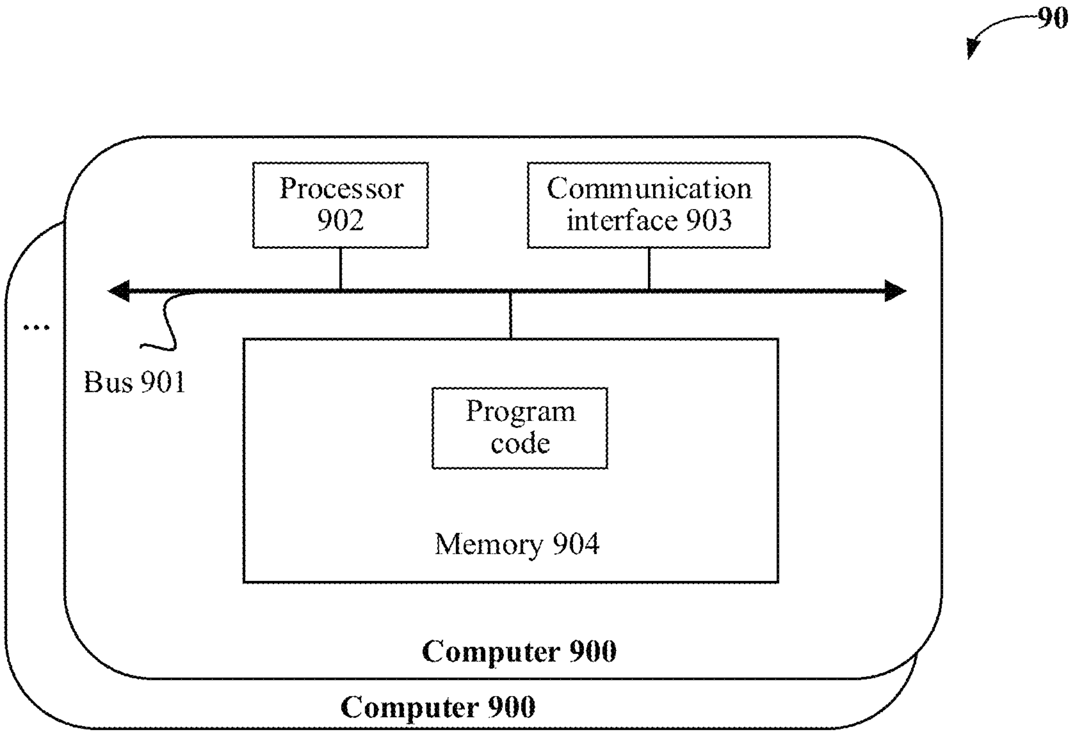
FIG. 9 is a schematic diagram of a structure of a cluster according to an embodiment of this disclosure.

FIG. 9 is a schematic diagram of a structure of a cluster 90. As shown in FIG. 9, the cluster 90 includes a plurality of computers 900. The device 900 includes a bus 901, a processor 902, a communication interface 903, and a memory 904. The processor 902, the memory 904, and the communication interface 903 communicate with each other through the bus 901.

The bus 901 may be a Peripheral Component Interconnect (PCI) bus, an Extended Industry Standard Architecture (EISA) bus, or the like. The bus may be classified into an address bus, a data bus, a control bus, and the like. For ease of indication, the bus is indicated through only one bold line in FIG. 9. However, it does not indicate that there is only one bus or only one type of bus.

The processor 902 may be any one or a plurality of processors such as a CPU, a graphics processing unit (GPU), a microprocessor (MP), or a digital signal processor (DSP).

The communication interface 903 is configured to communicate with an external device. For example, the communication interface 903 may be configured to receive a plurality of query statements sent by the client 200, obtain a begin time stamp and an end time stamp from the time server 500, or return a submission response to the client 200.

The memory 904 may include a volatile memory, for example, a random-access memory (RAM). The memory 904 may further include a non-volatile memory, for example, a read-only memory (ROM), a flash memory, a hard disk drive (HDD), or a solid-state drive (SSD).

The memory 904 stores executable code, and the processor 902 executes executable code to perform the foregoing transaction processing method.

When an embodiment shown in FIG. 1 is implemented, and components of the distributed database system 100 described in an embodiment of FIG. 1 are implemented through software, the software or the program code required for performing functions of the components in FIG. 1 is stored in the memory 904. The processor 902 executes program code that is corresponding to each component and that is stored in the memory 904, to perform the foregoing transaction processing method.

An embodiment of this disclosure further provides a computer-readable storage medium. The computer-readable storage medium includes instructions, and the instructions instruct the computer 900 to perform the foregoing transaction processing method applied to the distributed database system 100.

It should be noted that the instructions in the computer-readable storage medium may be executed by the plurality of computers 900 in the cluster 90. Therefore, each computer 900 may also perform a part of the transaction processing method applied to the distributed database system 100. For example, some computers may perform the steps performed by the coordinating node in the foregoing transaction processing method, and some other computers may perform the steps performed by the participating node in the foregoing transaction processing method.

An embodiment of this disclosure further provides a computer program product. When the computer program product is executed by a computer, the computer performs any one of the foregoing transaction processing methods. The computer program product may be a software installation package. When any one of the foregoing transaction processing methods needs to be used, the computer program product can be downloaded and executed on the computer.

What is claimed is:

1. A method, comprising:

receiving, by a coordinating node of a database system, a plurality of query statements, wherein the database system includes the coordinating node and a participating node, and wherein the coordinating node is an access node of a transaction;

creating, by the coordinating node and based on a first query statement in the plurality of query statements, the transaction;

executing, by the coordinating node and based on a second query statement in the plurality of query statements, the transaction in a global memory of the database system, wherein the global memory includes a part of memory in the coordinating node and a part of memory in the participating node, wherein either the coordinating node or the participating node can access the part of the other node in the global memory, wherein the remaining part of the memory in the coordinating node or the participating node is visible to the coordinating node or the participating node, and wherein when the second query statement indicates performing an insert operation and the second query statement carries record data, executing the transaction in the global memory comprises:

applying for global memory space with a specified quantity of copies; and filling, based on a node list in which the copies are located, the record data in the global memory of the coordinating node when the coordinating node is a node of a first copy; and submitting, by the coordinating node and based on a third query statement in the plurality of query statements, the transaction by:

sending a pre-synchronization request message to the participating node to notify the participating node to fill the record data in a copy of a global memory address of the record data in the participating node, wherein the pre-synchronization request message includes an operation type of insert, the global memory address of the record data, and the record data; and writing a log file and sending a synchronization request to the participating node to notify the participating node to write a log file after the coordinating node gathers pre-synchronization response messages received from all participating nodes and the pre-synchronization response messages all mark that pre-synchronization succeeds.

2. The method of claim 1, further comprising deploying the database system in a cluster, wherein the global memory comes from the cluster.

3. The method of claim 1, wherein executing, by the coordinating node, the transaction in the global memory comprises storing, by the coordinating node, a table record in the global memory, and wherein the method further comprises storing, by the coordinating node, an index tree and a management header of the table record in a local memory of the database system.

4. The method of claim 1, further comprising performing, by the participating node, data synchronization by unilaterally accessing the part of memory in the global memory across nodes when the coordinating node executes the transaction and causes a change of data stored in the part of memory in the global memory.

5. The method of claim 1, wherein creating the transaction comprises creating, based on the first query statement, a read/write transaction.

6. The method of claim 1, wherein before receiving, by the coordinating node, the plurality of query statements, the method further comprises:

receiving, by the coordinating node, the specified quantity of copies that are of a table record and that are in the global memory; and storing, by the coordinating node, the specified quantity of copies.

7. The method of claim 1, wherein submitting, by the coordinating node, the transaction comprises submitting, by the coordinating node, based on the third query statement, and according to a transaction submission protocol running on the coordinating node and the participating node, the transaction to implement real-time consistency between the coordinating node and the participating node.

8. The method of claim 7, further comprising triggering pessimistic concurrency control and optimistic concurrency control when a write conflict occurs in the transaction.

9. A database system, comprising:

a participating node; and a coordinating node comprising:

a first storage medium configured to store computer instructions; and one or more first processors coupled to the first storage medium and configured to execute the computer instructions to cause the coordinating node to:

receive a plurality of query statements;

create, based on a first query statement in the plurality of query statements, a transaction;

execute, based on a second query statement in the plurality of query statements, the transaction in a global memory of the database system, wherein the global memory includes a part of memory in the coordinating node and part of memory in the participating node, wherein either the coordinating node or the participating node can access the part of memory of the other node in the global memory, wherein the remaining part of memory in the coordinating node or the participating node is visible to the coordinating node or the participating node, and wherein when the second query statement indicates performing an insert operation and the second query statement carries record data, executing the transaction in the global memory comprises:

applying for global memory space with a specified quantity of copies; and filling, based on a node list in which the copies are located, the record data in the global memory of the coordinating node when the coordinating node is a node of a first copy; and submit, based on a third query statement in the plurality of query statements, the transaction by:

sending a pre-synchronization request message to the participating node to notify the participating node to fill the record data in a copy of a global memory address of the record data in the participating node, wherein the pre-synchronization request message includes an operation type of insert, the global memory address of the record data, and the record data; and writing a log file and sending a synchronization request to the participating node to notify the participating node to write a log file after the coordinating node gathers pre-synchronization response messages received from all participating nodes and the pre-synchronization response messages all mark that pre-synchronization succeeds.

10. The database system of claim 9, wherein the database system is deployed in a cluster, and wherein the global memory comes from the cluster.

11. The database system of claim 9, wherein the one or more first processors of the coordinating node are further configured to execute the computer instructions to cause the coordinating node to:

store a table record in the global memory; and store an index tree and a management header of the table record in a local memory of the database system.

12. The database system of claim 9, wherein the participating node comprises:

a second memory configured to store computer instructions; and one or more second processors coupled to the second memory and configured to execute the computer instructions to cause the participating node to perform data synchronization by unilaterally accessing the part of memory in the global memory across nodes when the coordinating node executes the transaction and causes a change of data stored in the part of memory in the global memory.

13. The database system of claim 9, wherein the coordinating node is a primary node of the database system, and the one or more first processors of the coordinating node are further configured to execute the computer instructions to cause the coordinating node to create a read/write transaction.

14. The database system of claim 9, wherein the one or more first processors of the coordinating node are further configured to execute the computer instructions to cause the coordinating node to:

receive the specified quantity of copies that are of a table record and that are in the global memory; and store the specified quantity of copies.

15. The database system of claim 9, wherein the one or more first processors of the coordinating node are further configured to execute the computer instructions to cause the coordinating node to submit, based on the third query statement and according to a transaction submission protocol running on the coordinating node and the participating node, the transaction to implement real-time consistency between the coordinating node and the participating node.

16. The database system of claim 15, wherein the one or more first processors of the coordinating node are further configured to execute the computer instructions to cause the coordinating node to trigger pessimistic concurrency control when a first write conflict occurs in the transaction, and wherein one or more second processors of the participating node are configured to execute the computer instructions to cause the participating node to trigger optimistic concurrency control when a second write conflict occurs in the transaction.

17. A coordinating node, comprising:

a first storage medium configured to store computer instructions; and one or more first processors coupled to the first storage medium and configured to execute the computer instructions to cause the coordinating node to:

receive a plurality of query statements;

create, based on a first query statement in the plurality of query statements, a transaction;

execute, based on a second query statement in the plurality of query statements, the transaction in a global memory of a database system, wherein the global memory includes a part of memory in the coordinating node and a part of memory in a participating node, wherein either the coordinating node or the participating node can access the part of memory of the other node in the global memory, wherein the remaining part of memory in the coordinating node or the participating node is visible to the coordinating node or the participating node, and wherein when the second query statement indicates performing an insert operation and the second query statement carries record data, executing the transaction in the global memory comprises:

applying for global memory space with a specified quantity of copies; and filling, based on a node list in which the copies are located, the record data in the global memory of the coordinating node when the coordinating node is a node of a first copy; and submit, based on a third query statement in the plurality of query statements, the transaction by:

sending a pre-synchronization request message to the participating node to notify the participating node to fill the record data in a copy of a global memory address of the record data in the participating node, wherein the pre-synchronization request message includes an operation type of insert, the global memory address of the record data, and the record data; and writing a log file and sending a synchronization request to the participating node to notify the participating node to write a log file after the coordinating node gathers pre-synchronization response messages received from all participating nodes and the pre-synchronization response messages all mark that pre-synchronization succeeds.

18. The coordinating node of claim 17, wherein the one or more first processors of the coordinating node are further configured to execute the computer instructions to cause the coordinating node to:

store a table record in the global memory; and store an index tree and a management header of the table record in a local memory of the database system.

19. The method of claim 1, further comprising:

obtaining, by the coordinating node, a begin timestamp from a time server that provides a monotonically increasing clock service upon creating the transaction; and identifying, by the coordinating node, visibility of a version of a table record to the transaction based on a relationship between the begin timestamp and a time window recorded in a management header of the table record, wherein the time window comprises a minimum timestamp representing a begin time of the version and a maximum timestamp representing an end time of the version.

20. The method of claim 1, wherein the database system further comprises a second secondary node configured to maintain quasi-real-time consistency with a primary node of the database system, and wherein the method further comprises:

receiving, by the second secondary node, a query request associated with a non-real-time analysis service; and periodically replaying, by the second secondary node, a redo log to generate a local index tree and table record data, wherein a minimum end timestamp of all active transactions in the database system is used as a replay end time for the redo log, and wherein the second secondary node returns a query result based on the query request.

* * * * *